(12) United States Patent
Ricciulli

(10) Patent No.: US 7,953,888 B2
(45) Date of Patent: *May 31, 2011

(54) ON-DEMAND OVERLAY ROUTING FOR COMPUTER-BASED COMMUNICATION NETWORKS

(75) Inventor: Livio Ricciulli, Los Gatos, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 789 days.

This patent is subject to a terminal disclaimer.

(21) Appl. No.: 10/630,559

(22) Filed: Jul. 30, 2003

(65) Prior Publication Data
US 2004/0022194 A1 Feb. 5, 2004

Related U.S. Application Data

(63) Continuation of application No. 09/916,628, filed on Jul. 27, 2001, now Pat. No. 6,778,502, which is a continuation of application No. 09/888,966, filed on Jun. 25, 2001, which is a continuation of application No. 09/336,487, filed on Jun. 18, 1999.

(51) Int. Cl.
*G06F 15/173* (2006.01)
(52) U.S. Cl. ...................................................... 709/239
(58) Field of Classification Search .................. 709/241, 709/239
See application file for complete search history.

(56) References Cited

U.S. PATENT DOCUMENTS

| | | | |
|---|---|---|---|
| 4,112,488 A | 9/1978 | Smith, III | ....................... 364/200 |
| 4,345,116 A | 8/1982 | Ash et al. | .................. 179/18 EA |
| 4,495,570 A | 1/1985 | Kitajima et al. | |
| 4,591,983 A | 5/1986 | Bennett et al. | |
| 4,594,704 A | 6/1986 | Ollivier | |
| 4,669,113 A | 5/1987 | Ash et al. | ....................... 379/221 |
| 4,679,189 A * | 7/1987 | Olson et al. | .................. 370/396 |
| 4,726,017 A | 2/1988 | Krum et al. | |
| 4,788,721 A | 11/1988 | Krishnan et al. | .............. 379/221 |
| 4,803,641 A | 2/1989 | Hardy et al. | |
| 4,839,798 A | 6/1989 | Eguchi et al. | |
| 4,839,892 A | 6/1989 | Sasaki | ............................ 370/95 |
| 4,847,784 A | 7/1989 | Clancey | |

(Continued)

FOREIGN PATENT DOCUMENTS

AU 763380 11/2003

(Continued)

OTHER PUBLICATIONS

A. Chankhunthod et al., "*A Hierarchical Internet Object Cache*", Journal, 1993.

(Continued)

*Primary Examiner* — Kevin Bates
*Assistant Examiner* — Minh-Chau Nguyen

(57) ABSTRACT

Methods and apparatus are disclosed for dynamically discovering and utilizing an optimized network path through overlay routing for the transmission of data. A determination whether to use a default network path or to instead use an alternate data forwarding path through one or more overlay nodes is based on real-time measurement of costs associated with the alternative paths, in response to a user request for transmission of message data to a destination on the network. Cost metrics include delay, throughput, jitter, loss, and security. The system chooses the best path among the default forwarding path and the multiple alternate forwarding paths, and implements appropriate control actions to force data transmission along the chosen path. No modification of established network communication protocols is required.

20 Claims, 5 Drawing Sheets

U.S. PATENT DOCUMENTS

| | | | |
|---|---|---|---|
| 4,905,233 A | 2/1990 | Cain et al. | 370/94.1 |
| 4,920,432 A | 4/1990 | Eggers | |
| 4,922,417 A | 5/1990 | Churm et al. | |
| 4,943,932 A | 7/1990 | Lark et al. | |
| 4,949,187 A | 8/1990 | Cohen | |
| 4,949,248 A | 8/1990 | Caro | |
| 4,985,830 A | 1/1991 | Atac et al. | 364/200 |
| 4,987,536 A | 1/1991 | Humblet | 364/200 |
| 5,029,232 A | 7/1991 | Nall | |
| 5,048,011 A | 9/1991 | Melen | |
| 5,058,105 A | 10/1991 | Mansour et al. | 370/16 |
| 5,088,032 A | 2/1992 | Bosack | 395/200 |
| 5,115,495 A | 5/1992 | Tsuchiya et al. | 395/200 |
| 5,128,926 A | 7/1992 | Perlman et al. | 370/54 |
| 5,130,792 A | 7/1992 | Tindell et al. | |
| 5,132,992 A | 7/1992 | Yurt et al. | |
| 5,136,716 A | 8/1992 | Harvey | |
| 5,172,413 A | 12/1992 | Bradley | |
| 5,191,573 A | 3/1993 | Hair | |
| 5,218,676 A | 6/1993 | Ben-Ayed et al. | 395/200 |
| 5,233,604 A * | 8/1993 | Ahmadi et al. | 370/238 |
| 5,253,248 A | 10/1993 | Dravida et al. | 370/16 |
| 5,253,275 A | 10/1993 | Yurt et al. | |
| 5,253,341 A | 10/1993 | Rozmanith | |
| 5,287,499 A | 2/1994 | Nemes | |
| 5,287,537 A | 2/1994 | Newmark et al. | |
| 5,291,554 A | 3/1994 | Morales | |
| 5,321,815 A | 6/1994 | Bartolanzo, Jr. et al. | 395/200 |
| 5,341,477 A | 8/1994 | Pitkin et al. | |
| 5,371,532 A | 12/1994 | Gelman | |
| 5,377,262 A | 12/1994 | Bales et al. | 379/220 |
| 5,410,343 A | 4/1995 | Coddington | |
| 5,414,455 A | 5/1995 | Hooper | |
| 5,430,729 A | 7/1995 | Rahnema | 270/94.1 |
| 5,442,389 A | 8/1995 | Blahut | |
| 5,442,390 A | 8/1995 | Hooper | |
| 5,442,749 A | 8/1995 | Northcutt | |
| 5,452,294 A | 9/1995 | Natarajan | 370/54 |
| 5,457,680 A * | 10/1995 | Kamm et al. | 370/332 |
| 5,471,467 A | 11/1995 | Johann | 370/60 |
| 5,471,622 A | 11/1995 | Eadline | |
| 5,475,615 A | 12/1995 | Lin | |
| 5,491,690 A | 2/1996 | Alfonsi et al. | 370/60 |
| 5,508,732 A | 4/1996 | Bottomley | |
| 5,515,511 A | 5/1996 | Nguyen | |
| 5,519,435 A | 5/1996 | Anderson | |
| 5,519,836 A | 5/1996 | Gawlick et al. | 395/200 |
| 5,526,414 A | 6/1996 | Bédard et al. | 379/221 |
| 5,528,281 A | 6/1996 | Grady | |
| 5,532,939 A | 7/1996 | Psinakis et al. | 364/514 |
| 5,539,621 A | 7/1996 | Kikinis | |
| 5,542,087 A | 7/1996 | Neimat et al. | |
| 5,544,313 A | 8/1996 | Shachnai | |
| 5,544,327 A | 8/1996 | Dan | |
| 5,550,577 A | 8/1996 | Verbiest | |
| 5,550,863 A | 8/1996 | Yurt | |
| 5,550,982 A | 8/1996 | Long | |
| 5,557,317 A | 9/1996 | Nishio | |
| 5,559,877 A | 9/1996 | Ash et al. | 379/221 |
| 5,572,643 A | 11/1996 | Judson | |
| 5,590,288 A | 12/1996 | Castor | |
| 5,592,611 A | 1/1997 | Midgely | |
| 5,594,910 A | 1/1997 | Filepp et al. | |
| 5,596,722 A | 1/1997 | Rahnema | 395/200.15 |
| 5,603,026 A | 2/1997 | Demers et al. | |
| 5,608,721 A | 3/1997 | Natarajan et al. | 370/238 |
| 5,619,648 A | 4/1997 | Canale | |
| 5,623,656 A | 4/1997 | Lyons | |
| 5,625,781 A | 4/1997 | Cline | |
| 5,627,829 A | 5/1997 | Gleeson et al. | |
| 5,630,067 A | 5/1997 | Kindell | |
| 5,633,999 A | 5/1997 | Clowes | |
| 5,634,006 A | 5/1997 | Baugher et al. | |
| 5,638,443 A | 6/1997 | Stefik et al. | |
| 5,644,714 A | 7/1997 | Kikinis | |
| 5,646,676 A | 7/1997 | Dewkett et al. | |
| 5,649,108 A * | 7/1997 | Spiegel et al. | 709/241 |
| 5,649,186 A | 7/1997 | Ferguson | |
| 5,659,729 A | 8/1997 | Nielsen | |
| 5,666,362 A | 9/1997 | Chen | |
| 5,671,279 A | 9/1997 | Elgamai | |
| 5,675,734 A | 10/1997 | Hair | |
| 5,682,512 A | 10/1997 | Tetrick | |
| 5,699,347 A | 12/1997 | Callon | |
| 5,699,513 A | 12/1997 | Feigen et al. | |
| 5,712,979 A | 1/1998 | Graber et al. | |
| 5,715,453 A | 2/1998 | Stewart | |
| 5,721,914 A | 2/1998 | DeVries | |
| 5,721,916 A | 2/1998 | Pardikar | 395/617 |
| 5,734,831 A | 3/1998 | Sanders | |
| 5,740,423 A | 4/1998 | Logan et al. | |
| 5,742,762 A | 4/1998 | Scholl | |
| 5,751,961 A | 5/1998 | Smyk | |
| 5,754,790 A | 5/1998 | France et al. | 395/200.68 |
| 5,761,507 A | 6/1998 | Govett | |
| 5,761,663 A | 6/1998 | Lagarde et al. | |
| 5,764,906 A | 6/1998 | Edelstein et al. | |
| 5,774,526 A | 6/1998 | Propp et al. | 379/90.01 |
| 5,774,660 A | 6/1998 | Brendel et al. | |
| 5,774,668 A | 6/1998 | Choquier et al. | |
| 5,777,989 A | 7/1998 | McGarvey | |
| 5,784,058 A | 7/1998 | LaStrange et al. | |
| 5,787,271 A | 7/1998 | Box et al. | 395/500 |
| 5,787,470 A | 7/1998 | DeSimone et al. | 711/124 |
| 5,790,541 A | 8/1998 | Patrick et al. | 370/392 |
| 5,796,952 A | 8/1998 | Davis | |
| 5,799,141 A | 8/1998 | Galipeau et al. | |
| 5,802,106 A | 9/1998 | Packer | |
| 5,802,291 A | 9/1998 | Balick et al. | |
| 5,802,503 A | 9/1998 | Sansone | 705/401 |
| 5,812,769 A | 9/1998 | Graber et al. | |
| 5,815,664 A | 9/1998 | Asano | |
| 5,819,092 A | 10/1998 | Ferguson | |
| 5,826,031 A | 10/1998 | Nielsen | |
| 5,828,847 A | 10/1998 | Gehr | |
| 5,832,506 A | 11/1998 | Kuzma | |
| 5,832,514 A | 11/1998 | Norin et al. | |
| 5,835,718 A | 11/1998 | Blewett | |
| 5,838,906 A | 11/1998 | Doyle et al. | |
| 5,845,303 A | 12/1998 | Templeman | |
| 5,854,899 A * | 12/1998 | Callon et al. | 709/238 |
| 5,856,974 A | 1/1999 | Gervais et al. | |
| 5,862,339 A | 1/1999 | Bonnaure | |
| 5,867,706 A | 2/1999 | Martin et al. | |
| 5,867,799 A | 2/1999 | Lang et al. | |
| 5,870,546 A | 2/1999 | Kirsch | |
| 5,870,559 A | 2/1999 | Leshem et al. | |
| 5,878,212 A | 3/1999 | Civanlar et al. | |
| 5,884,038 A | 3/1999 | Kapoor | |
| 5,890,171 A | 3/1999 | Blumer et al. | |
| 5,893,116 A | 4/1999 | Simmonds et al. | |
| 5,894,554 A | 4/1999 | Lowery et al. | |
| 5,896,533 A | 4/1999 | Ramos et al. | |
| 5,898,668 A | 4/1999 | Shaffer | |
| 5,903,723 A | 5/1999 | Beck et al. | |
| 5,907,704 A | 5/1999 | Gudmundson et al. | |
| 5,913,028 A | 6/1999 | Wang et al. | |
| 5,913,033 A | 6/1999 | Grout | |
| 5,918,010 A | 6/1999 | Appleman et al. | |
| 5,918,021 A | 6/1999 | Aditya | 395/200.65 |
| 5,919,247 A | 7/1999 | Van Hoff et al. | |
| 5,920,701 A | 7/1999 | Miller et al. | |
| 5,922,049 A | 7/1999 | Radia et al. | 395/200.65 |
| 5,931,904 A | 8/1999 | Banga | |
| 5,933,832 A | 8/1999 | Suzuoka et al. | |
| 5,935,207 A | 8/1999 | Logue et al. | |
| 5,944,780 A | 8/1999 | Chase | |
| 5,945,989 A | 8/1999 | Freishtat et al. | |
| 5,956,489 A | 9/1999 | San Andres et al. | |
| 5,956,716 A | 9/1999 | Kenner | |
| 5,958,008 A | 9/1999 | Pogrebisky et al. | |
| 5,961,596 A | 10/1999 | Takubo et al. | |
| 5,966,440 A | 10/1999 | Hair | |
| 5,968,121 A | 10/1999 | Logan et al. | |
| 5,978,791 A | 11/1999 | Farber et al. | |
| 5,983,214 A | 11/1999 | Lang et al. | |
| 5,983,227 A | 11/1999 | Nazem et al. | |

| Patent | Kind | Date | Inventor |
|---|---|---|---|
| 5,987,606 | A | 11/1999 | Cirasole et al. |
| 5,991,809 | A | 11/1999 | Kriegsman |
| 5,996,025 | A | 11/1999 | Day |
| 6,002,720 | A | 12/1999 | Yurt et al. |
| 6,003,030 | A | 12/1999 | Kenner et al. |
| 6,006,264 | A | 12/1999 | Colby et al. |
| 6,012,090 | A | 1/2000 | Chung et al. |
| 6,014,686 | A | 1/2000 | Elnozahy et al. |
| 6,014,698 | A | 1/2000 | Griffiths |
| 6,016,307 | A | 1/2000 | Kaplan et al. ............... 370/238 |
| 6,018,516 | A | 1/2000 | Packer |
| 6,021,426 | A | 2/2000 | Douglis |
| 6,026,440 | A | 2/2000 | Sharder et al. |
| 6,029,175 | A | 2/2000 | Chow et al. |
| 6,029,176 | A | 2/2000 | Cannon |
| 6,035,332 | A | 3/2000 | Ingrassia, Jr. et al. |
| 6,038,216 | A | 3/2000 | Packer |
| 6,038,310 | A | 3/2000 | Hollywood et al. |
| 6,038,610 | A | 3/2000 | Belfiore et al. |
| 6,041,324 | A | 3/2000 | Earl et al. |
| 6,044,405 | A | 3/2000 | Driscoll, III et al. |
| 6,046,980 | A | 4/2000 | Packer |
| 6,049,831 | A | 4/2000 | Gardell et al. |
| 6,052,718 | A | 4/2000 | Gifford |
| 6,052,730 | A | 4/2000 | Feliciano et al. |
| 6,065,051 | A | 5/2000 | Steele et al. |
| 6,065,062 | A | 5/2000 | Periasamy et al. |
| 6,070,191 | A | 5/2000 | Narendran et al. |
| 6,078,943 | A | 6/2000 | Yu |
| 6,081,829 | A | 6/2000 | Sidana |
| 6,081,835 | A | 6/2000 | Antcliff |
| 6,084,858 | A * | 7/2000 | Matthews et al. ............. 370/238 |
| 6,092,112 | A | 7/2000 | Fukushige |
| 6,092,204 | A | 7/2000 | Baker |
| 6,098,078 | A | 8/2000 | Gehani |
| 6,105,028 | A | 8/2000 | Sullivan et al. |
| 6,108,673 | A | 8/2000 | Brandt et al. |
| 6,108,703 | A | 8/2000 | Leighton et al. |
| 6,112,231 | A | 8/2000 | DeSimone et al. |
| 6,112,239 | A | 8/2000 | Kenner et al. |
| 6,112,240 | A | 8/2000 | Pogue et al. |
| 6,115,357 | A | 9/2000 | Packer et al. |
| 6,115,752 | A | 9/2000 | Chauhan |
| 6,119,143 | A | 9/2000 | Dias et al. |
| 6,125,388 | A | 9/2000 | Reisman |
| 6,125,394 | A | 9/2000 | Rabinovich |
| 6,128,279 | A | 10/2000 | O'Neil et al. |
| 6,128,601 | A | 10/2000 | Van Horne et al. |
| 6,128,660 | A | 10/2000 | Grimm et al. |
| 6,130,890 | A | 10/2000 | Leinwand et al. |
| 6,134,583 | A | 10/2000 | Herriot |
| 6,137,792 | A * | 10/2000 | Jonas et al. ............... 370/354 |
| 6,144,375 | A | 11/2000 | Jain et al. |
| 6,144,702 | A | 11/2000 | Yurt et al. |
| 6,144,996 | A | 11/2000 | Starnes et al. |
| 6,151,624 | A | 11/2000 | Teare et al. |
| 6,154,738 | A | 11/2000 | Call |
| 6,154,744 | A | 11/2000 | Kenner et al. |
| 6,154,753 | A | 11/2000 | McFarland |
| 6,154,777 | A | 11/2000 | Ebrahim |
| 6,163,779 | A | 12/2000 | Mantha et al. |
| 6,167,427 | A | 12/2000 | Rabinovich et al. |
| 6,173,311 | B1 | 1/2001 | Hassett et al. |
| 6,173,322 | B1 | 1/2001 | Hu |
| 6,178,160 | B1 | 1/2001 | Bolton et al. |
| 6,181,867 | B1 | 1/2001 | Kenner et al. |
| 6,185,598 | B1 | 2/2001 | Farber et al. ............... 709/200 |
| 6,185,619 | B1 | 2/2001 | Joffe et al. |
| 6,189,030 | B1 | 2/2001 | Kirsch et al. |
| 6,189,039 | B1 | 2/2001 | Harvey |
| 6,195,680 | B1 | 2/2001 | Goldszmidt |
| 6,205,120 | B1 | 3/2001 | Packer et al. |
| 6,226,618 | B1 | 5/2001 | Downs |
| 6,226,642 | B1 | 5/2001 | Beranek et al. |
| 6,230,196 | B1 | 5/2001 | Guenthner et al. |
| 6,236,642 | B1 * | 5/2001 | Shaffer et al. ............... 370/237 |
| 6,243,752 | B1 | 6/2001 | Butt |
| 6,243,760 | B1 | 6/2001 | Armbruster et al. |
| 6,249,810 | B1 | 6/2001 | Kiraly |
| 6,256,675 | B1 | 7/2001 | Rabinovich |
| 6,263,313 | B1 | 7/2001 | Milsted |
| 6,266,699 | B1 | 7/2001 | Sevcik |
| 6,269,394 | B1 | 7/2001 | Kenner et al. |
| 6,272,566 | B1 | 8/2001 | Craft |
| 6,275,470 | B1 | 8/2001 | Ricciulli |
| 6,282,569 | B1 | 8/2001 | Wallis et al. |
| 6,282,574 | B1 | 8/2001 | Voit |
| 6,286,045 | B1 | 9/2001 | Griffiths et al. |
| 6,298,041 | B1 | 10/2001 | Packer |
| 6,310,858 | B1 * | 10/2001 | Kano et al. ............... 370/235 |
| 6,311,214 | B1 | 10/2001 | Rhoads |
| 6,314,565 | B1 | 11/2001 | Kenner et al. |
| 6,330,602 | B1 | 12/2001 | Law et al. |
| 6,332,195 | B1 | 12/2001 | Green et al. |
| 6,338,044 | B1 | 1/2002 | Cook et al. |
| 6,347,085 | B2 | 2/2002 | Kelly |
| 6,360,256 | B1 | 3/2002 | Lim |
| 6,363,053 | B1 | 3/2002 | Schuster et al. |
| 6,370,571 | B1 | 4/2002 | Medin, Jr. |
| 6,370,580 | B2 | 4/2002 | Kriegsman |
| 6,398,245 | B1 | 6/2002 | Gruse |
| 6,400,681 | B1 | 6/2002 | Bertin et al. |
| 6,405,252 | B1 | 6/2002 | Gupta et al. |
| 6,405,257 | B1 | 6/2002 | Gersht et al. |
| 6,412,000 | B1 | 6/2002 | Riddle et al. |
| 6,415,280 | B1 | 7/2002 | Farber et al. |
| 6,418,421 | B1 | 7/2002 | Hurtado |
| 6,421,726 | B1 | 7/2002 | Kenner et al. |
| 6,430,618 | B1 | 8/2002 | Karger et al. |
| 6,442,549 | B1 | 8/2002 | Schneider |
| 6,449,259 | B1 | 9/2002 | Allain et al. |
| 6,452,922 | B1 | 9/2002 | Ho |
| 6,456,630 | B1 | 9/2002 | Packer et al. |
| 6,460,082 | B1 | 10/2002 | Lumelsky |
| 6,460,085 | B1 | 10/2002 | Toporek et al. |
| 6,463,454 | B1 | 10/2002 | Lumelsky |
| 6,463,508 | B1 | 10/2002 | Wolf |
| 6,470,389 | B1 | 10/2002 | Chung et al. |
| 6,473,405 | B2 | 10/2002 | Ricciulli |
| 6,480,893 | B2 | 11/2002 | Kriegsman |
| 6,484,143 | B1 | 11/2002 | Swildens et al. |
| 6,484,204 | B1 | 11/2002 | Rabinovich |
| 6,490,580 | B1 | 12/2002 | Dey et al. |
| 6,493,707 | B1 | 12/2002 | Dey et al. |
| 6,496,477 | B1 | 12/2002 | Perkins et al. |
| 6,496,856 | B1 | 12/2002 | Kenner et al. |
| 6,502,125 | B1 | 12/2002 | Kenner et al. |
| 6,502,135 | B1 | 12/2002 | Munger et al. |
| 6,502,215 | B2 | 12/2002 | Raad et al. |
| 6,505,248 | B1 | 1/2003 | Casper et al. |
| 6,507,577 | B1 | 1/2003 | Mauger et al. |
| 6,512,761 | B1 | 1/2003 | Schuster et al. |
| 6,529,477 | B1 | 3/2003 | Toporek et al. |
| 6,529,499 | B1 | 3/2003 | Doshi et al. |
| 6,542,469 | B1 * | 4/2003 | Kelley et al. ............... 370/238 |
| 6,553,413 | B1 | 4/2003 | Leighton et al. |
| 6,553,420 | B1 | 4/2003 | Karger et al. |
| 6,557,054 | B2 | 4/2003 | Reisman |
| 6,564,251 | B2 | 5/2003 | Katariya et al. |
| 6,577,595 | B1 | 6/2003 | Counterman |
| 6,577,600 | B1 | 6/2003 | Bare ............... 370/238 |
| 6,581,090 | B1 | 6/2003 | Lindbo et al. |
| 6,584,083 | B1 | 6/2003 | Toporek et al. |
| 6,587,837 | B1 | 7/2003 | Spagna |
| 6,591,299 | B2 | 7/2003 | Riddle et al. |
| 6,611,812 | B2 | 8/2003 | Hurtado et al. |
| 6,611,862 | B2 | 8/2003 | Reisman |
| 6,611,872 | B1 * | 8/2003 | McCanne ............... 709/238 |
| 6,614,781 | B1 | 9/2003 | Elliott et al. |
| 6,625,643 | B1 | 9/2003 | Colby et al. |
| 6,654,344 | B1 | 11/2003 | Toporek et al. |
| 6,654,807 | B2 | 11/2003 | Farber et al. |
| 6,658,464 | B2 | 12/2003 | Reisman |
| 6,658,479 | B1 * | 12/2003 | Zaumen et al. ............... 709/238 |
| 6,665,706 | B2 | 12/2003 | Kenner et al. |
| 6,665,726 | B1 | 12/2003 | Leighton et al. |
| 6,690,651 | B1 | 2/2004 | Lamarque, III et al. |
| 6,691,148 | B1 | 2/2004 | Zinky et al. |

| | | |
|---|---|---|
| 6,694,358 B1 | 2/2004 | Swildens et al. |
| 6,697,333 B1 * | 2/2004 | Bawa et al. ............... 370/238 |
| 6,699,418 B2 | 3/2004 | Okada et al. |
| 6,708,137 B2 | 3/2004 | Carley |
| 6,718,328 B1 | 4/2004 | Norris |
| 6,741,563 B2 | 5/2004 | Packer |
| 6,744,767 B1 | 6/2004 | Chiu et al. |
| 6,751,673 B2 | 6/2004 | Shaw |
| 6,754,219 B1 * | 6/2004 | Cain et al. ................ 370/401 |
| 6,754,699 B2 | 6/2004 | Swildens et al. |
| 6,754,706 B1 | 6/2004 | Swildens et al. |
| 6,763,377 B1 | 7/2004 | Belknap et al. |
| 6,763,388 B1 | 7/2004 | Tsimelzon |
| 6,778,494 B1 | 8/2004 | Mauger |
| 6,778,502 B2 | 8/2004 | Ricciulli |
| 6,799,221 B1 | 9/2004 | Kenner et al. |
| 6,801,576 B1 | 10/2004 | Haldeman et al. |
| 6,831,895 B1 | 12/2004 | Ji et al. |
| 6,834,306 B1 | 12/2004 | Tsimelzon |
| 6,842,604 B1 | 1/2005 | Cook et al. |
| 6,859,791 B1 | 2/2005 | Spagna |
| 6,870,851 B1 | 3/2005 | Leinwand et al. |
| 6,874,032 B2 | 3/2005 | Gersht et al. |
| 6,888,797 B1 | 5/2005 | Cao et al. |
| 6,901,604 B1 | 5/2005 | Kiraly |
| 6,904,017 B1 | 6/2005 | Meempat et al. |
| 6,915,329 B2 | 7/2005 | Kriegsman |
| 6,928,442 B2 | 8/2005 | Farber et al. |
| 6,934,255 B1 | 8/2005 | Toporek et al. |
| 6,950,623 B2 | 9/2005 | Brown et al. |
| 6,954,784 B2 | 10/2005 | Aiken, Jr. et al. |
| 6,963,910 B1 | 11/2005 | Belknap |
| 6,963,980 B1 | 11/2005 | Mattsson |
| 6,963,981 B1 | 11/2005 | Bailey et al. |
| 6,965,890 B1 | 11/2005 | Dey et al. |
| 6,970,432 B1 | 11/2005 | Hankins et al. |
| 6,973,485 B2 | 12/2005 | Ebata et al. |
| 6,973,490 B1 | 12/2005 | Robertson et al. |
| 6,981,050 B1 | 12/2005 | Tobias et al. |
| 6,981,180 B1 | 12/2005 | Bailey et al. |
| 6,996,616 B1 | 2/2006 | Leighton et al. |
| 7,003,572 B1 | 2/2006 | Lownsbrough et al. |
| 7,007,089 B2 | 2/2006 | Freedman |
| 7,010,578 B1 | 3/2006 | Lewin et al. |
| 7,012,900 B1 | 3/2006 | Riddle |
| 7,039,633 B1 | 5/2006 | Dey et al. |
| 7,047,300 B1 | 5/2006 | Oehrke et al. |
| 7,054,935 B2 | 5/2006 | Farber et al. |
| 7,058,706 B1 | 6/2006 | Iyer et al. |
| 7,069,177 B2 | 6/2006 | Carley |
| 7,096,266 B2 | 8/2006 | Lewin et al. |
| 7,103,564 B1 | 9/2006 | Ehnebuske |
| 7,103,645 B2 | 9/2006 | Leighton et al. |
| 7,110,984 B1 | 9/2006 | Spagna |
| 7,117,259 B1 | 10/2006 | Rohwer |
| 7,127,513 B2 | 10/2006 | Karger et al. |
| 7,159,035 B2 | 1/2007 | Garcia-Luna-Aceves et al. |
| 7,187,658 B2 * | 3/2007 | Koyanagi et al. ............ 370/254 |
| 7,188,085 B2 | 3/2007 | Pelletier |
| 7,206,748 B1 | 4/2007 | Gruse |
| 7,240,100 B1 | 7/2007 | Wein et al. |
| 7,260,060 B1 | 8/2007 | Abaye et al. |
| 7,457,233 B1 | 11/2008 | Gan et al. |
| 2001/0029525 A1 | 10/2001 | Lahr |
| 2001/0056500 A1 | 12/2001 | Farber et al. |
| 2002/0018449 A1 | 2/2002 | Ricciulli |
| 2002/0023164 A1 | 2/2002 | Lahr |
| 2002/0023165 A1 | 2/2002 | Lahr |
| 2002/0032029 A1 * | 3/2002 | Angin ................ 455/428 |
| 2002/0040404 A1 | 4/2002 | Lahr |
| 2002/0042817 A1 | 4/2002 | Lahr |
| 2002/0046273 A1 | 4/2002 | Lahr et al. |
| 2002/0046405 A1 | 4/2002 | Lahr |
| 2002/0049857 A1 | 4/2002 | Farber et al. |
| 2002/0059592 A1 | 5/2002 | Kiraly |
| 2002/0062388 A1 * | 5/2002 | Ogier et al. ............... 709/238 |
| 2002/0066038 A1 | 5/2002 | Mattsson |
| 2002/0073199 A1 | 6/2002 | Levine et al. |
| 2002/0082999 A1 | 6/2002 | Lee et al. |
| 2002/0083124 A1 | 6/2002 | Knox et al. |
| 2002/0099850 A1 | 7/2002 | Farber et al. |
| 2002/0124080 A1 | 9/2002 | Leighton et al. |
| 2002/0129134 A1 | 9/2002 | Leighton et al. |
| 2002/0131645 A1 | 9/2002 | Hamilton |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0147842 A1 * | 10/2002 | Breitbart et al. ............ 709/241 |
| 2002/0163882 A1 | 11/2002 | Bornstein et al. |
| 2002/0163889 A1 * | 11/2002 | Yemini et al. ............... 370/238 |
| 2002/0199016 A1 | 12/2002 | Freedman |
| 2003/0009444 A1 | 1/2003 | Eidler et al. |
| 2003/0018966 A1 | 1/2003 | Cook et al. |
| 2003/0028623 A1 | 2/2003 | Hennessey et al. |
| 2003/0028626 A1 | 2/2003 | Hennessey et al. |
| 2003/0028777 A1 | 2/2003 | Hennessey et al. |
| 2003/0055972 A1 | 3/2003 | Fuller et al. |
| 2003/0061263 A1 | 3/2003 | Riddle |
| 2003/0061280 A1 | 3/2003 | Bulson et al. |
| 2003/0078888 A1 | 4/2003 | Lee et al. |
| 2003/0078889 A1 | 4/2003 | Lee et al. |
| 2003/0105604 A1 | 6/2003 | Ash et al. |
| 2004/0022194 A1 | 2/2004 | Ricciulli |
| 2004/0139097 A1 | 7/2004 | Farber et al. |
| 2004/0177148 A1 | 9/2004 | Tsimelzon |
| 2005/0033858 A1 | 2/2005 | Swildens et al. |
| 2005/0038851 A1 | 2/2005 | Kriegsman |
| 2005/0100027 A1 | 5/2005 | Leinwand et al. |
| 2005/0114296 A1 | 5/2005 | Farber et al. |
| 2005/0262104 A1 | 11/2005 | Robertson et al. |
| 2006/0143293 A1 | 6/2006 | Freedman |

FOREIGN PATENT DOCUMENTS

| | | |
|---|---|---|
| CA | 2202572 | 10/1998 |
| CA | 2335661 | 9/2001 |
| CA | 2335662 | 9/2001 |
| CA | 2467998 | 4/2006 |
| CN | ZL99810853.7 | 8/2004 |
| EP | 0637153 | 7/1993 |
| EP | 0637153 A1 | 7/1993 |
| EP | 0660569 | 12/1993 |
| EP | 0343611 B1 | 8/1994 |
| EP | 0865180 A2 | 9/1998 |
| EP | 0660569 A1 | 12/1998 |
| EP | 1104555 | 6/2001 |
| GB | 2353877 | 3/2004 |
| IL | 140935 | 3/2006 |
| JP | 5-130144 | 5/1993 |
| JP | 10-70571 | 3/1998 |
| JP | 2002522995 | 7/2002 |
| JP | 3566626 | 6/2004 |
| JP | 2005124165 | 5/2005 |
| JP | 3762649 | 1/2006 |
| NI | 176482 | 8/2003 |
| WO | WO 98/57465 | 12/1998 |
| WO | WO 00/33511 | 8/2000 |

OTHER PUBLICATIONS

Collins, "*The Detour Framework for Packet Rerouting*", Journal Oct. 29, 1998.

D. Estrin et al., "*Source Demand Routing: Packet Format and Forwarding Specification (Version 1)*", May 1996, Memo; Internet RFC/STD/FYI/BCP Archives, RFC1940; Network Working Group.

Deborah Estrin et al., "*Source Demand Routing Protocol Specification (Version 1)*", Oct. 10, 1992, memo; Internet Draft; Network Working Group.

C. Hedrick., "*Routing Information Protocol*", Jun. 1998, Memo, Internet Working Group, Request for Comments: 1058; http://www.cis.ohio-state.edu/cgi-bin/rfc/rfc1058.html.

Savage et al., "*Detour: Informed Internet Routing and Transport*", Jan.-Feb. 1999, IEEE, pp. 50-59.

Segall et al., "*QoS Routing Using Alternate Paths*".

Touch, "The X-Bone", USC/Information Sciences Institute, NGI Workshop White Paper—Mar. 1997.

A. Thyagarajan et al., "*Making the Mbone Rea*", May 10, 1995, Internet , http://www.isoc.org/HMP/PAPER/227/html/paper.html.

D. Wessels, "*Configuring Hierarchical Squid Caches*", Aug. 19, 1997.

D. Wessels et al., "Internet Cache Protocol (ICP), Version 2", Sep. 1997, Memo; Internet RFC/STD/FYI/BCP Archives, RFC2186; Network Working Group.

D. Wessels et al., "Application of Internet Cache Protocol (ICP), Version 2", Sep. 1997, Memo; Internet RFC/STD/FYI/BCP Archives, RFC2187; Network Working Group.

R. Woodburn et al., "*A scheme for an Internet Encapsulation Protocol: Version 1*", Jul. 1991, Internet , http://www.cis.ohio-state.edu/cgi-vin/rfc/rfc1241.html, pp. 1-17.

Web Site, "Scaling the Internet," Inktomi Corp., www.inktomi.com, pp. 1-5 (likely prior to Jun. 18, 1999).

Web Site, "Are you Akamaized?", Akamai, www.akamai.com, 1999, pp. 1-2 (likely prior to Jun. 18, 1999).

Office Action from corresponding European Application No. 00941508.4-2416 mailed Aug. 9, 2006.

Roch A. Guerin et al, "QoS Routing Mechanisms and OSPF Extensions", Global Telecommunications Conference, US, New York, IEEE, Nov. 3, 1997, pp. 1903-1908, XP000737848 ISBN: 0-7803-4199-6.

Office Action from corresponding Canadian Application No. 2,374,621 mailed Jun. 23, 2006.

Joint Claim Construction and Prehearing Statement from Civil Action No. CV 02-3708 CRB.

Memorandum and Order from Civil Action No. C 02-03708 CRB.

Exhibit A Regarding U.S. Patent No. 6,275,470 from Civil Action Case 3:02-cv-03708-CRB.

Akamai Technologies, Inc.'s Amended Answer to Complaint, Affirmative Defenses and Counterclaims; Demand for Jury Trial from Civil Action No. CV 02-3708 CRB.

Cable & Wireless' Reply to Akamai Technologies, Inc.'s Amended Answer and Counterclaims from from Civil Action No. CV 02-3708 CRB.

Exhibit C Regarding U.S. Patent No. 5,774,660 from Civil Action Case 3:02-CV-03708-CRB.

"Akamai's Preliminary Claim Construction for Disputed Term, Phrases, or Clauses for the '470 Patent", Exh. B, to Joint Claim Construction and Prehearing Statement, filed in civil case No. CV-02-3708 (CRB), Mar. 31, 2003.

"U.S. Patent No. 6,275,470—CWIS Disputed Claim Constructions", Exh. A, to Joint Claim Construction and Prehearing Statement, filed in civil case No. CV-02-3708 (CRB), Mar. 31, 2003.

American Heritage College Dictionary, 3d. Ed., 1997, pp. 79, 283, 709, 842, 1413.

American Heritage Dictionary, 2nd College Ed., "meaningful" to "mechanism" (p. 776), "merry-bells" to "metamorphosis", (pp. 788-789) "respectability" to "restharrow" (p. 1053), filed as an exhibit in civil case No. CV-02-3708 (CRB), Dec. 2002.

Chankhunthod, A. et al., "A Hierarchical Internet Object Cache", Proc. of the 1996 USENIX Technical Conf., Jan. 1996, pp. 153-163.

Chart titled "Collins The Detour Framework for Packet Rerouting anticipates the 470 Patent." [1 pg.], Exh. I to Decl. of Leighton in Support of Defendant Akamai's Opposition to Plaintiffs Motion for PI, in case No. CV-02-3708 (CRB), Dec. 2002.

Chart titled "RFC 2186, RFC 2187 and Chankunthod et al. 'A Hierarchical Internet Object Cache' render the '470 Patent Obvious" [3 pgs.], Exh. M to Decl. of Leighton in Support of Defendant Akamai's Opposition to Plaintiffs Motion for PI, in case No. CV-02-3708 (CRB) Dec. 2002.

Chart titled Segall et al. 'QoS Routing Using Alternate Paths' anticipates the '470 Patent [2 pgs.], Exh. G to Decl. Of Leighton in Support of Defendant Akamai's Opposition to Plaintiffs Motion for PI, in case No. CV-02-3708 (CRB), Dec. 2002.

Chart titled U.S. Patent No. 5,774,660 Is material to the Patentability of the 470 Patent, Exh. C to Decl. Of Bestavros in Support of Defendant Akamai's Opposition to Plaintiffs Motion for Preliminary Injunction, filed Dec. 2, 2002 in Civil Action 3:02-cv-03708-CRB.

Chart titled: "The Combination of RFC 1241 and U.S. Patent No. 6,016,307 to Kaplan et al. anticipates the '470 Patent" [2 pgs.], Exh. D to Decl. of Leighton in Support of Defendant Akamai's Opposition to Plaintiffs Motion for PI, in case No. CV-02-3708 (CRB), Dec. 2002.

Collins, A. The Detour Framework for Packet Rerouting. Master's thesis, University of Washington, Oct. 1998.

Declaration of Frank Thomson Leighton in Support of Defendant Akamai Technologies, Inc.'s Answering Brief on Claim Construction, filed May 19, 2003 in No. CV-02-3708 (CRB).

Declaration of Frank Thomson Leighton in Support of Defendant Akamai Technologies, Inc.'s Opposition to Plaintiff's Motion for Preliminary Injunction, filed in civil case No. CV-02-3708 (CRB), Dec. 2, 2002 [23 pages], and Exhibits A-M.

Declaration of Tony Clark in Support of Plaintiff's Proposed Claim Construction, filed May 1, 2003 in No. CV-02-3708 (CRB).

Defendant Akamai Technologies, Inc.'s Answering Brief on Claim Construction filed May 19, 2003 in civil case No. CV-02-3708 (CRB).

Defendant Akamai Technologies, Inc.'s Opposition to Plaintiff's Motion for Preliminary Injunction, filed Dec. 20, 2002 in civil case No. CV-02-3708 (CRB).

Dyson, P., The Network Press Dictionary of Networking, 2d ed., p. 343, 1995.

Estrin, D., et al., "Source Demand Routing Protocol Specification (Version 1)", Oct. 10, 1992, Memo; Internet Draft; Network Working Group.

Estrin, D., et al., RFC 1940, "Source Demand Routing: Packet Format and Forwarding Specification (Version 1)", May 1996, Memo; Internet RFC/STD/FYI/BCP Archives, Network Working Group.

Freedman, A., "The Computer Glossary. The complete Illustrated Dictionary", 8th Ed., 1998 (ISBN 0-8144-7978-2), p. 72.

Hedrick, C., RFC 1058 "Routing Information Protocol", Jun. 1998, Memo, Internet Working Group.

Joint Claim Construction and Prehearing Statement, filed Mar. 31, 2003 in civil Case 3:02-cv-03708-CRB [7 pages], with exhibit A [9 pages] and exhibit B [12 pgs].

Mills, D. & Woodburn, R., A Scheme for an Internet Encapsulation Protocol: Version 1. RFC 1241, DDN Network Information Center, Jul. 1991.

Nader, J.C., Prentice Hall's Illustrated Dictionary of Computing, 2d. ed., 1995, p. 110.

Newton, H., 'Newton's Telecom Dictionary', Flatiron Publishing, Inc., pp. 610-611, Sep. 1995.

Newton, H., 'Newton's Telecom Dictionary', p. 198, Feb. 2001.

Plaintiff's Opening Claim Construction Brief Construing the Terms At Issue in U.S. Patent No. 6,275,470, filed May 1, 2003 in civil case No. CV-02-3708 (CRB). [28 pgs.].

Plaintiff's Reply Claim Construction Brief Construing the Terms At Issue in U.S. Patent No. 6,275,470, filed May 27, 2003 in civil case No. CV-02-3708 (CRB).

Reply Declaration of Tony Clark in Support of CWIS' Proposed Claim Construction, filed May 27, 2003 in civil case No. CV-02-3708 (CRB).

Savage, S. et al., "Detour: A Case for Informed Internet Routing and Transport", IEEE Micro, vol. 19, No. 1, Jan./Feb. 1999.

Segall, A., et al. "QoS Routing Using Alternate Paths." Journal of High Speed Networks, 7(2):141-158, 1998.

Thyagarajan, A., et al., "Making the Mbone Real", May 10, 1995, Internet , http://www.isoc.org/HMP/Paper/227/html/paper.html.

Touch, J. "The X-Bone", USC/Information Sciences Institute, Workshop on Research Directions for the Next-Generation Internet, Vienna, VA, May 13-14, 1997.

Touch, J. et al., "The X-Bone,". Third Global Internet Mini-Conference at Globecom '98. Sydney, Australia, Nov. 1998, pp. 59-68 (pp. 44-52 of the mini-conference).

Wessels, D. "Configuring Hierarchical Squid Caches", Aug. 19, 1997.

Wessels, D. et al., RFC2186, "Internet Cache Protocol (ICP), Version 2", Sep. 1997, Memo; Internet RFC/STD/FYI/BCP Archives, Network Working Group.

Wessels, D. et al., RFC2187, "Application of Internet Cache Protocol (ICP), Version 2", Sep. 1997, Memo; Internet RFC/STD/FYI/BCP Archives; Network Working Group.

Bahk, S. et al., "Dynamic multi-path routing and how it compares with other dynamic routing algorithms for high speed wide area networks," Proceedings of ACM SIGCOMM '92, Aug. 1992.

Garcia-Luna-Aveces, J.J. et al., "A Practical Approach to Minimizing Delays in Internet Routing Protocols," Proc. IEEE ICC '99, Vancouver, Canada, Jun. 6-10, 1999.

Murthy, S. et al., "Routing architecture for mobile integrated service networks," Mobile Networks and Applications, vol. 3, No. 4, pp. 391-407, 1998.

Wang, Z. et al., "Shortest Path First with Emergency Exits," Proceedings of the ACM SIGCOMM Symposium on Communications Architectures and Protocols, Philadelphia, PA, Sep. 1990, pp. 166-176.

"Cisco DistributedDirector," Cisco Systems, Inc., White Paper, (1996 or 1997 month unknown). [9 pages].

"Detour: Informed Internet Routing and Transport," Savage, et al., IEEE Micro, vol. 19, issue 1, pp. 50-59, Jan./Feb. 1999, 10 pages.

"Memorandum to Judge Robert G. Doumar, Counsel for Level 3 Communications, Counsel for Limelight" from Prof. Ellen W. Zegura, re definition of terms in Civil Action No. 2:07cv589 (WDK-FBS) [8 pgs.].

"Opinion and Order," (Markman—claim construction Order), U.S. Dist. Judge Mark S. Davis, Dec. 10, 2008 in Civil Action No. 2:07cv589 (WDK-FBS), in US District Court, Norfolk, VA. [51 pgs.].

Almeroth, K., et al. "Scalable Delivery of Web Pages Using Cyclic Best-Effort (UDP) Multicast", IEEE INFOCOM, San Francisco, California, USA, Jun. 1998.

Almeroth, K., Exhibit H to Expert Report of Dr. Kevin C. Almeroth filed in Civil Action No. 2:07cv589 (RGD-FBS), U.S. Dist. Ct. E.D. Va., dated Jul. 25, 2008 [59 pages].

Almeroth, K., Exhibit I to Expert Report of Dr. Kevin C. Almeroth filed in Civil Action No. 2:07cv589 (RGD-FBS), U.S. Dist. Ct. E.D. Va., dated Jul. 25, 2008 [95 pages].

Almeroth, K., Exhibit J to Expert Report of Dr. Kevin C. Almeroth filed in Civil Action No. 2:07cv589 (RGD-FBS), U.S. Dist. Ct. E.D. Va., dated Jul. 25, 2008, [105 pages].

Almeroth, K., Exhibit K-1 to Expert Report of Dr. Kevin C. Almeroth filed in Civil Action No. 2:07cv589 (RGD-FBS), U.S. Dist. Ct. E.D. Va., dated Jul. 25, 2008, [152 pages].

Almeroth, K., Exhibit K-2 to Expert Report of Dr. Kevin C. Almeroth filed in Civil Action No. 2:07cv589 (RGD-FBS), U.S. Dist. Ct. E.D. Va., dated Jul. 25, 2008 [25 pages].

Almeroth, K., Expert Report of Dr. Kevin C. Almeroth filed in Civil Action No. 2:07cv589 (RGD-FBS), U.S. Dist. Ct. E.D. Va., dated Jul. 25, 2008. [64 pages and Exhibits H-J, K1, K2].

Almeroth, K., Reply and Supplemental Report of Dr. Kevin C. Almeroth to the Answering Report of Mr. Tony Clark, filed in Civil Action No. 2:07cv589 (RGD-FBS), Sep. 5, 2008. [56 pgs.].

Almeroth, K., Supplemental Expert Report of Dr. Kevin C. Almeroth, filed in Civil Action No. 2:07cv589 (RGD-FBS), Aug. 25, 2008 [6 pgs.].

Baentsch, M., et al., "Introducing Application-Level Replication and Naming into Today's Web," Computer Networks and ISDN Systems, vol. 28, No. 7-11, pp. 921-930, May 1996.

Berners-Lee, T. & Connolly, D., "Hypertext Markup Language—2. 0," Internet Engineering Task Force (IEFT) Request for Comments (RFC) 1866, Nov. 1995.

Berners-Lee, T., et al., "Hypertext Transfer Protocol—HTTP/1.0," Internet Engineering Task Force (IETF) Internet Draft, draft-ietf-http-v10-spec-00.ps, Mar. 1995.

Berners-Lee, T., et al., "Hypertext Transfer Protocol—HTTP/1.0," Internet Engineering Task Force (IETF) Request for Comments (RFC) 1945, May 1996.

Berners-Lee, T., et al., RFC 1738—Uniform Resource Locators, Dec. 1994.

Berners-Lee, T.. "Resource Identifiers in WWW: A Unifying Syntax for the Expression of Names and Addresses of Objects on the Network as used in the World-Wide Web," Internet Engineering Task Force (IETF) Request for Comments (RFC) 1630, Jun. 1994.

Bestavros, A. Demand-based document dissemination to reduce traffic and balance load in distributed information systems. In Proc. IEEE Symp. on Parallel and Distributed Processing, San Antonio, TX, Oct. 1995.

Bhattacharjee et al., "Application-layer anycasting," in Proc. IEEE INFOCOM '97, Apr. 1997.

Brisco, T. P. RFC 1794: DNS support for load balancing, Apr. 1995.

Callon, R., "Use of OSI IS-IS for Routing in TCP/IP and Dual Environments," Internet Engineering Task Force (IETF) Request for Comments (RFC) 1195, Dec. 1990.

Chandra, R. et al., "BGP Communities Attribute," Internet Engineering Task Force (IETF) Request for Comments (RFC) 1997, Aug. 1996.

Chen, E., et al., "An Application of the BGP Community Attribute in Multi-home Routing," Internet Engineering Task Force (IETF) Request for Comments (RFC) 1998, Aug. 1996.

Clark, T, Answering Report of Tony Clark Pursuant to Fed. R. Civ. P. 26(a)(2)(b) Concerning the Validity of U.S. Patent No. 6,473,405, Aug. 25, 2008, in Civil Action No. 2:07cv589 (RGD-FBS), E.D. Va. [87 pgs.

Clark, T, Exhibit A, to Answering Report of Tony Clark Pursuant to Fed. R. Civ. P. 26(a)(2)(b) Concerning The Validity of U.S. Patent No. 6,473,405, Aug. 25, 2008, in Civil Action No. 2:07cv589 (RGD-FBS), E.D. Va. [3 pgs.].

Clark, T, Exhibit B, to Answering Report of Tony Clark Pursuant to Fed. R. Civ. P. 26(a)(2)(b) Concerning the Validity of U.S. Patent No. 6,473,405, Aug. 25, 2008, in Civil Action No. 2:07cv589 (RGD-FBS), E.D. Va. [2 pgs.].

Clark, T, Supplemental Answering Report of Tony Clark Pursuant to Fed. R. Civ. P. 26(a)(2)(b) Concerning the Validity of U.S. Patent No. 6,473,405, Dec. 17, 2008, in Civil Action No. 2:07cv589 (RGD-FBS), E.D. Va. (22 pgs.).

Colajanni, M., et al., "Scheduling Algorithms for Distributed Web Servers," International Conf. on Distributed Computing Systems (ICDCS), Baltimore, Maryland, USA, May 1997.

Declaration Kevin C. Almeroth in Support of Limelight Networks, Inc.'s Motion for Summary Judgment of Non-Infringement and Invalidity of All Patents-In-Suit, filed Aug. 28, 2008 in Civil Action No. 2:07cv589 (RGD-FBS) [39 pgs.].

Declaration of Courtney Holohan in Support of Limelight Networks, Inc.'s Motion for Summary Judgment of Non-Infringement and Invalidity of All Patents-In-Suit, including Exhibits A-V, Filed Aug. 28, 2008 in Civil Action No. 2:07cv589 [277 pgs.].

Defendant Limelight Network Inc.'s Combined Motion for Leave to Amend Its Answer and to Compel Related Interrogatory Responses, in Civil Action No. 2:07cv589, Sep. 9, 2008 [4 pgs. and exhibits 1-2].

Defendant Limelight Network Inc.'s Memorandum of Points and Authorities in Support of Its Combined Motion for Leave to Amend Its Answer and to Compel Related Interrogatory Responses (Public Version), in Civil Action No. 2:07cv589, Sep. 9, 2008 [18 pgs.].

Defendant Limelight Network Inc.'s Notice of Deposition of Andrew Collins, in Civil Action No. 2:07cv589 (WDK-FBS), [28 pgs.].

Defendant Limelight Network Inc.'s Rebuttal Brief in Support of Its Combined Motion for Leave to Amend Its Answer and Compel Related Interrogatory Responses (Public version), filed Oct. 7, 2008 in civil action No. 2:07-cv-00589-MSD-FBS [21 pgs.].

Defendant Limelight Network Inc.'s Supplemental Responses to Plaintiffs First Set of Interrogatories (Redacted), Apr. 21, 2008, in civil action No. 2:07-cv-00589-WDK-FBS [46 pgs.].

Defendant Limelight Networks, Inc.'s Claim Construction Brief for U.S. Patent Nos. 6,654,807; 7,054,935 and 6,473,405, in Civil Action No. 2:07cv589, Jun. 27, 2008, with Exhibits 1-24 [333 pgs.].

Defendant Limelight Networks, Inc.'s Claim Construction Brief for U.S. Patent Nos. 6,654,807; 7,054,935; and 6,473,405, filed in Civil Action No. 2:07CV589 (RGD-fBS), Jun. 27, 2008 [38 pgs.].

Defendant Limelight Networks, Inc.'s Reply Brief in Support of Its Motion for Summary Judgment of Non-Infringement and Invalidity of All Patents-In-Suit, filed Oct. 1, 2008 in Civil Action No. 2:07cv589 (JBF-FBS) [21 pgs.].

Defendant Limelight Networks, Inc.'s Memorandum in Support of its Motion for Summary Judgment of Non-Infringement and Invalidity of all Patents-In-Suit, [Redacted] for Civil Action No. 2:07cv589 (RGD-FBS), Aug. 28, 2008 [31 pgs.].

Defendant Limelight Networks, Inc.'s Supplemental Responses to Plaintiffs First Set of Interrogatories (No. 2-4, 12-13, and 19) [Redacted], May 16, 2008, in civil action No. 2:07-cv-00589-WDK-FBS [70 pgs.].

Defendant Limelight Networks, Inc.'s Supplemental Responses to Plaintiffs First Set of Interrogatories (Nos. 1-11, 13-14, 17 and 19-20, [redacted] Feb. 9, 2008, in civil action No. 2:07-cv-00589-RGD-FBS [101 pgs.].

Delgrossi, L. et al., "Internet Stream Protocol Version 2 (ST2) Protocol Specification—Version ST2+" Network Working Group ST2 Working Group, Request for Comments (RFC) 1819, Aug. 1995 [109 pgs.].

Deposition of Livio Ricciulli, in Civil Action No. 2:07cv589 (WDK-FBS), Aug. 19, 2008, Exhibit 144, Email from Livio Ricciulli dated May 7, 1999 [1 pg.].

Deposition of Livio Ricciulli, in Civil Action No. 2:07cv589 (WDK-FBS), Aug. 19, 2008, Exhibit 147, email from Livio Ricciulli dated Mar. 21, 1999 [6 pgs.].

Eriksson, H., "MBONE: The Multicast Backbone," Communications of the ACM, vol. 37, No. 8, p. 54-60, Aug. 1994.

Exhibit 140 to Deposition of Livio Ricciulli, in Civil Action No. 2:07cv589 (WDK-FBS), Aug. 19, 2008, document titled "Defendant Limelight Network, Inc.'s First Notice of Rule 30(b)(6) Deposition of Level 3 Communications, LLC," dated Jul. 18, 2008 [11 pgs.].

Exhibit 141 to Deposition of Livio Ricciulli, in Civil Action No. 2:07cv589 (WDK-FBS), Aug. 19, 2008, document titled "Subpoena in a Civil Case," Jun. 19, 2008 [9 pgs].

Exhibit 146 to Deposition of Livio Ricciulli, in Civil Action No. 2:07cv589 (WDK-FBS), Aug. 19, 2008, document titled "Declaration and Power of Attorney for Original US Patent Application" [2 pgs.].

Exhibit 148 to Deposition of Livio Ricciulli, in Civil Action No. 2:07cv589 (WDK-FBS), Aug. 19, 2008, email from Patrick Lincoln, dated Mar. 21, 1999 [8 pgs.].

Exhibit 149 to Deposition of Livio Ricciulli, in Civil Action No. 2:07cv589 (WDK-FBS), Aug. 19, 2008, email from Patrick Lincoln dated Apr. 17, 1999 [1 pg.].

Exhibit 150 to Deposition of Livio Ricciulli, in Civil Action No. 2:07cv589 (WDK-FBS), Aug. 19, 2008, document titled "Detour: Informed Internet Routing and Transport," Savage, et al., IEEE Micro, vol. 19, issue 1, pp. 50-59, Jan./Feb. 1999, 10 pages.

Exhibit 151 to Deposition of Livio Ricciulli, in Civil Action No. 2:07cv589 (WDK-FBS), Aug. 19, 2008, document titled "Livio Ricciulli's Resume" [4 pgs.].

Exhibit 152, Deposition of Livio Ricciulli, in Civil Action No. 2:07cv589 (WDK-FBS), Aug. 19, 2008, email, dated Dec. 2, 1999 [1 pg.].

Exhibit 56 to Deposition of Maurice Andrew Collins in Civil Action No. 2:07cv589 (WDK-FBS), "Defendant Limelight Networks, Inc.'s Notice of Deposition of Andrew Collins," Aug. 29, 2008 [28 pgs.].

Exhibit 57 to Deposition of Maurice Andrew Collins in Civil Action No. 2:07cv589 (WDK-FBS), Document titled "Detour: Informed Internet Routing and Transport," Savage, et al., IEEE Micro, vol. 19, issue 1, pp. 50-59, Jan./Feb. 1999 [10 pgs.].

Exhibit 58 to Deposition of Maurice Andrew Collins in Civil Action No. 2:07cv589 (WDK-FBS), document titled Internet Archive Wayback Machine, sample search Sep. 9, 2008 [1 pg.].

Exhibit 59 to Deposition of Maurice Andrew Collins in Civil Action No. 2:07cv589 (WDK-FBS), Document titled "Detour," deponent Collins, Sep. 9, 2008, [1 pg.].

Exhibit 65 to Deposition of Kevin F. Delgadillo, Sep. 9, 2008, in Civil Action No. 2:07cv589 (WDK-FBS), Document titled Subpoena in a Civil Case [12 pgs.].

Exhibit 66 to Deposition of Kevin F. Delgadillo, Sep. 9, 2008, in Civil Action No. 2:07cv589 (WDK-FBS), Document titled, "Cisco DistributedDirector," [9 pgs.].

Exhibit 67 to Deposition of Kevin F. Delgadillo, Sep. 9, 2008, in Civil Action No. 2:07cv589 (WDK-FBS), Document titled, "Electronic Publishing Form," dated Nov. 27, 1996 [5 pgs.].

Exhibit 68 to Deposition of Kevin F. Delgadillo, Sep. 9, 2008, in Civil Action No. 2:07cv589 (WDK-FBS), Email from Kevin Delgadillo, dated Jul. 19, 1996 [1 pg.].

Exhibit 69 to Deposition of Kevin F. Delgadillo, Sep. 9, 2008, in Civil Action No. 2:07cv589 (WDK-FBS), Document titled, "Cisco Advantage: Leveraging Intranet and Internet Productivity." [9 pgs.].

Exhibit A to Level 3 Communications, LLC's Objections and Responses to Limelight Networks. Inc.'s First Set of Interrogatories, Apr. 21, 2008, in civil action No. 2:07-cv-00589-WDK-FBS [68 pgs.].

Exhibit A to Plaintiff Level 3 Communications, LLC's Memorandum of Law in Opposition to Defendant Limelight Networks, Inc.'s Combined Motion for Leave to Amend Its Answer and to Compel Related Interrogatory Responses, Document 155-2 in Case 2:07-cv-00589-JBF-FBS [7 pgs.].

Exhibit A to Reply and Supplemental Report of Dr. Kevin C. Almeroth to the Answering Report of Mr. Tony Clark filed in Civil Action No. 2:07cv589 (RGD-FBS), Sep. 5, 2008 [6 pgs.].

Exhibit B to Reply and Supplemental Report of Dr. Kevin C. Almeroth to the Answering Report of Mr. Tony Clark filed in Civil Action No. 2:07cv589 (RGD-FBS), Sep. 5, 2008 [56 pgs.].

Exhibit E to Plaintiff Level 3 Communications, LLC's Memorandum of Law in Opposition to Defendant Limelight Networks, Inc.'S Combined Motion for Leave to Amend Its Answer and to Compel Related Interrogatory Responses, Document 155-6 in Case 2:07-cv-00589-JBF-FBS [7 pgs.].

Exhibit F to Plaintiff Level 3 Communications, LLC's Memorandum of Law in Opposition to Defendant Limelight Networks, Inc.'S Combined Motion for Leave to Amend Its Answer and to Compel Related Interrogatory Responses, Document 155-7 in Case 2:07-cv-00589-JBF-FBS [8 pgs.].

Exhibit G to Plaintiff Level 3 Communications, LLC's Memorandum of Law in Opposition to Defendant Limelight Networks, Inc.'S Combined Motion for Leave to Amend Its Answer and to Compel Related Interrogatory Responses, Document 155-8 in Case 2:07-cv-00589-JBF-FBS [5 pgs.].

Exhibits A-G of Plaintiff Level 3 Communications, LLC's Memorandum of Law in Opposition to Defendant Limelight Networks, Inc.'s Combined Motion for Leave to Amend Its Answer and to Compel Related Interrogatory Responses, Sep. 30, 2008, Civil Action No. 2:07cv589, (Exhibit A [7 pgs.], B [5 pgs.], C [47 pgs.], D [45 pgs.], E [7 pgs.], F [8 pgs.], G [5 pgs.]).

Exhibits A-V filed in support of Limelight Networks, Inc.'s Motion for Summary Judgment of Non-Infringement and Invalidity of All Patents-In-Suit, Aug. 28, 2008 in Civil Action No. 2:07cv589 (JBF-FBS) [277 pgs.].

Fielding, R., et al., "Hypertext Transfer Protocol—HTTP/1.1," Internet Engineering Task Force (IETF) Internet Draft, draft-ietf-http-v11-spec-00.txt, Nov. 1995.

Fielding, R., et al., "Hypertext Transfer Protocol—HTTP/1.1," Internet Engineering Task Force(IETF) Request for Comments (RFC) 2068, Jan. 1997.

Jury Verdict Form in Civil Action No. 2:07cv589 (MSD-FBS), Jan. 23, 2009 [3 pgs.].

Level 3 Communications Supplemental Exhibit A in Civil Action No. 2:07cv589 (JBF-FBS) [69 pgs.].

Level 3 Communications, LLC's Non-Confidential Version of its Opposition Brief to Defendant's Motion for Summary Judgment of Non-Infringement and Invalidity of all Patents-In-Suit [Redacted], in Civil Action No. 2:07cv589 (JBF-FBS), Sep. 17, 2008.

Level 3 Communications, LLC's Objections and Answers to Defendant Limelight Networks, Inc.'s Sixth Set of Interrogatories, Feb. 9, 2008, in civil action No. 2:07-cv00589-WDK-FBS [9 pgs.].

Level 3 Communications, LLC's Objections and Answers to Defendant Limelight Networks, Inc.'s Third Set of Interrogatories, [redacted], Aug. 18, 2008, in civil action No. 2:07-cv-00589-WDK-FBS [10 pgs].

Level 3 Communications, LLC's Objections and Responses to Limelight Networks. Inc.'s First Set of Interrogatories, [redacted] Apr. 21, 2008, in civil action No. 2:07-cv-00589-WDK-FBS [28 pgs].

Level 3 Communications, LLC's Second Supplemental Response to Limelight Networks, Inc.'s First Set of Interrogatories (No. 15), Nov. 2, 2008 in civil action No. 2:07-cv-00589-RGD-FBS [9 pgs.].

Level 3 Communications, LLC's Second Supplemental Response to Limelight Networks, Inc.'s First Set of Interrogatories (No. 4) [Redacted], Nov. 3, 2008 in civil action No. 2:07-cv-00589-RGD-FBS [8 pgs.].

Level 3 Communications, LLC's Supplemental Responses to Limelight Networks, Inc.'s First Set of Interrogatories (No. 10) [Redacted], Jun. 11, 2008 in civil action No. 2:07-cv-00589-RGD-FBS [6 pgs.].

Level 3 Communications, LLC's Supplemental Responses to Limelight Networks, Inc.'s First Set of Interrogatories (Nos. 14 and 15) [Redacted], May 30, 2008 in civil action No. 2:07-cv-00589-RGD-FBS [10 pgs.].

Level 3 Markman Presentation Powerpoint, in Civil Action No. 2:07cv589, Jul. 9, 2008 [16 pgs.].

Level 3's Memorandum of Law in Reply to Limelight's Claim Construction Brief, in Civil Action No. 2:07cv589, Jul. 3, 2008, with Exhibits F-H.

Limelight Claim Construction Hearing Presentation, in Civil Action No. 2:07cv589, Jul. 14, 2008 [123 pgs.].

Limelight Networks Inc.'s Response to the Report of Professor Ellen W. Zegura, Sep. 5, 2008, in Civil Action No. 2:07cv589 (WDK-FBS) [5 pgs.].

Malkin, G., "RIP Version 2 Carrying Additional Information," Internet Engineering Task Force (IETF) Request for Comments (RFC) 1388, Jan. 1993.

Memorandum of Law in Support of Level 3's proposed Claim Constructions, Filed Jun. 13, 2008 in Civil Action No. 2:07cv589 RDG-FBS, with exhibits [170 pgs.].

Memorandum on Markman terms to: Judge Robert G. Doumar, Counsel for Level 3 Communications, Counsel for Limelight from: Court appointed technical expert, Professor Ellen W. Zegura Re: Definition of terms, in civil action No. 2:07-cv-00589-MSD-FBS, *Level 3 Communications, LLC v. Limelight Networks, Inc.* (Aug. 2008).

Mockapetris, P., RFC 1034: Domain Names—Concepts and Facilities, Nov. 1987.

Mockapetris, P., RFC 1035: Domain Names—Implementation and Specification, Nov. 1987.

Moy, J., "OSPF Version 2," Internet Engineering Task Force (IETF) Request for Comments (RFC) 1583, Mar. 1994.

Order from Judge Doumar in civil action No. 2:07-cv-00589-MSD-FBS, *Level 3 Communications, LLC v. Limelight Networks, Inc.* instructing Court-Appointed Expert, Professor Ellen W. Zegura Re: Definition of claim terms, Jul. 25, 2008, [2 pgs.].

Parris C., et al, "A Dynamic Connection Management Scheme for Guaranteed Performance Services in Packet-Switching Integrated Services Networks," UC Berkeley Computer Science Division Tech. Report TR-93-005, 1993.

Parris C., et al, "The Dynamic Management of Guaranteed Performance Connections in Packet Switched Integrated Service Networks," UC Berkeley Computer Science Division and International Computer Science Institute Tech. Report CSD-94-859, 1994.

Partridge, C., et al., "Host Anycasting Service," Internet Engineering Task Force (IETF) Request for Comments (RFC) 1546, Nov. 1993.

Plaintiff Level 3 Communications, LLC's Memorandum of Law in Opposition to Defendant Limelight Networks, Inc.'s Combined Motion for Leave to Amend Its Answer and to Compel Related Interrogatory Responses, Sep. 30, 2008, Civil Action No. 2:07cv589, [31 pages].

Plaintiff Level 3 Communications, LLC'S Response to Defendant Limelight Networks, Inc.'S Response to Report of Professor Ellen Zegura, Sep. 9, 2008, in Civil Action No. 2:07cv589 (WDK-FBS) [5 pgs.].

Public Version of Defendant Limelight Networks, Inc.'s Memorandum in Support of its Motion for Summary Judgment of Invalidity of U.S. Patent No. 6,473,405, filed Dec. 3, 2008, in Civil Action No. 2:07cv589 [18 pgs.].

Rekhter Y., et al., "A Border Gateway Protocol 4 (BGP-4)," Internet Engineering Task Force (IETF) Request for Comments (RFC) 1771, Mar. 1995.

Rekhter Y., et al., "Application of the Border Gateway Protocol in the Internet," Internet Engineering Task Force (IETF) Request for Comments (RFC) 1772, Mar. 1995.

Topolcic, C., "Experimental Internet Stream Protocol, Version 2 (ST-II)," Internet Engineering Task Force (IETF) Request for Comments (RFC) 1190, Oct. 1990.

Traina, P., "BGP-4 Protocol Analysis," Internet Engineering Task Force (IETF) Request for Comments (RFC) 1774, Mar. 1995.

Traina, P., "Experience with the BGP-4 protocol," Internet Engineering Task Force (IETF) Request for Comments (RFC) 1773, Mar. 1995.

Transcript, Deposition of Kevin F. Delgadillo, in Civil Action No. 2:07cv589 (WDK-FBS), Milpitas, CA, Sep. 9, 2008 [23 pgs.].

Transcript, Deposition of Livio Ricciulli, in Civil Action No. 2:07cv589 (WDK-FBS), Aug. 19, 2008, Los Angeles, CA [252 pgs.].

Transcript, Deposition of Maurice Andrew Collins, in Civil Action No. 2:07cv589 (WDK-FBS), Seattle, WA, Sep. 9, 2008 [136 pgs.].

Answer of Defendant Limelight Networks, Inc. In Civil Action No. 2:07cv589 (WDK-FBS) (E.D. Va.) Feb. 1, 2008 [14 pgs.].

Defendant Limelight Networks, Inc.'S Reply Brief in Support of Its Motion for Summary Judgment of Non-Infringement and Invalidity of All Patents-In-Suit, in Civil File No. 2:07CV589 (E.D. Va.), Oct. 1, 2008 [21 pgs.].

Defendant Limelight Networks, Inc.'s Claim Construction Brief for U.S. Patent Nos. 6,654,807; 7,054,935; and 6,473,405, in Civil Action No. 2:07cv589 (RGD-FBS) (E.D. Va.), Jun. 27, 2008 [38 pgs. + exhibits].

Exhibit 142 to Deposition of Livio Ricciulli, in Civil Action No. 2:07cv589 (WDK-FBS), Aug. 19, 2008, U.S. Patent No. 6,275,470, Ricciulli [14 pgs.].

Exhibit 143 to Deposition of Livio Ricciulli, in Civil Action No. 2:07cv589 (WDK-FBS), Aug. 19, 2008, U.S. Patent No. 6,473,405, Ricciulli [14 pgs.].

Exhibit 145 to Deposition of Livio Ricciulli, in Civil Action No. 2:07cv589 (WDK-FBS), Aug. 19, 2008, Document titled, "On-Demand Overlay Routing for Computer-Based Communication Networks," [32 pgs.].

Exhibit A (claim chart) to Almeroth, K., Supplemental Expert Report of Dr. Kevin C. Almeroth, filed in Civil Action No. 2:07cv589 (RGD-FBS), Aug. 25, 2008.

Exhibit to Limelight Markman Brief in Civil Action No. 2:07cv589 (WDK-FBS)—Swart Deposition excerpt [1 pg.].

Exhibits to Limelight Markman Brief in Civil Action No. 2:07cv589 (WDK-FBS) [295 pgs.].

Joint Statement Regarding Claim Construction [4 pgs.] with Exhibit "The '807 and '935 Footprint Patents," [23 pgs.] in Civil Action No. 2:07cv589 (RGD-FBS) (E.D. Va.), filed Jul. 9, 2008 [27 pgs.].

Level 3 Markman Presentation Powerpoint, in Civil Action No. 2:07cv589, Jul. 9, 2008 [16 pgs.].

Level 3 vs. Limelight Networks, Inc. in Civil Action No. 2:07cv589 (WDK-FBS), Order, Filed Jul. 25, 2008 in US District Court, Norfolk, VA. [2 pgs.].

Memorandum of Law in Support of Level 3's Proposed Claim Constructions in Case No. 2:07cv589 RDG FBS, (E.D. Va.) Jun. 14, 2008 [32 pgs. + exhibits].

Second Supplemental Expert Report of Dr. Kevin C. Almeroth Civil Action No. 2:07cv589 (RGD-FBS) (E.D. Va.) Dec. 24, 2008 [9 pgs.].

Transcript of Proceedings for Jury Trial, Norfolk, VA, Jan. 7-23, 2009, in Civil Action No. 2:07cv589 (E.D. Va.) [1052 pgs.].

Transcript of Proceedings for Markman Follow-up Hearing, Norfolk, VA, Oct. 23, 2008, in Civil Action No. 2:07cv589 (E.D. Va.) [58 pgs.].

Transcript of Proceedings for Markman Hearing, Norfolk, VA, Jul. 14, 2008, in Civil Action No. 2:07cv589 (E.D. Va.) [69 pgs.].

Japanese Patent Publication JP 10-70571,Jun. 1997, International Business Machines Corporation, English translation provided with Office Action [34 pgs.].

Japanese Patent Publication JP 5-130144, Published May 25, 1993, Fujitsu Ltd., English translation provided with Office Action [9 pgs.].

Office Action dated Dec. 8, 2009 in Japanese Application No. 2001-504633 (based on PCT/US001/16732, titled "On-Demand Overlay Routing for Computer-based communication networks," Inventor: Ricciulli, Livio) [in Japanese, 2 pgs., with 2 page English translation].

Awduche, et al., Requirements for Traffic Engineering Over MPLS, published as RFC2702 in Sep. 1999, IETF, Network Working Group, available at http://www.rfc-editor.org/rfc/rfc2702.txt [29 pgs.].

Haskin and Boyd, A Method for Setting an Alternative Label Switched Paths to Handle Fast Reroute, Jun. 1999, IETF, Network Working Group, available at http://tools.ietf.org/id/draft-haskin-mpls-fast-reroute-00.txt.

Moy, OSPF Version 2, published as RFC 2328 in Apr. 1998, IETF, Network Working Group, available at http://www.rfc-editor.org/rfc/rfc2328.txt [245 pgs.].

"Memorandum in Support of Limelight's Motion in Limine No. 7 to Exclude Testimony From Level 3's Experts Not Disclosed in Their Expert Reports Regarding the Disclosures of the Patents-In-Suit," filed in Civil Action No. 2:07cv589 (MSD-FBS), U.S. Dist. Ct. E.D. Va., Dec. 4, 2008 [6 pgs.].

Complaint for Injunctive and Other Relief, filed Dec. 17, 2007 in Civil Action No. 2:07CV589 [12 pgs.].

Defendant Limelight Networks, Inc.'s Memorandum in Support of Motion for Leave to File an Additional Motion for Summary Judgment and for Summary Judgment If Leave Is Granted, filed Dec. 3, 2008 in Civil Action No. 2:07cv589 (RGD-FBS) [5 pgs.].

Deposition of Thomas E. Anderson, in Civil Action No. 2:07cv589 (WDK-FBS), Seattle, WA, Dec. 2, 2008, Exhibit 1, email message [1 pg.].

Deposition of Thomas E. Anderson, in Civil Action No. 2:07cv589 (WDK-FBS), Seattle, WA, Dec. 2, 2008, Exhibit 2, email message Sep. 17, 1999 [2 pgs.].

Deposition of Thomas E. Anderson, in Civil Action No. 2:07cv589 (WDK-FBS), Seattle, WA, Dec. 2, 2008, Exhibit 282, bio. of Thomas Anderson [14 pgs.].

Deposition of Thomas E. Anderson, in Civil Action No. 2:07cv589 (WDK-FBS), Seattle, WA, Dec. 2, 2008, Exhibit 283, document titled Detour: Informed Internet Routing and Transport by Stefan Savage et al., University of Washington, Seattle, IEEE Micro, Jan. 1999. [10 pgs.].

Deposition of Thomas E. Anderson, in Civil Action No. 2:07cv589 (WDK-FBS), Seattle, WA, Dec. 2, 2008, Exhibit 284, email dated Jun. 26, 1998. [2 pgs.].

Deposition of Thomas E. Anderson, in Civil Action No. 2:07cv589 (WDK-FBS), Seattle, WA, Dec. 2, 2008, Exhibit 285, presentation [5 pgs.].

Deposition of Thomas E. Anderson, in Civil Action No. 2:07cv589 (WDK-FBS), Seattle, WA, Dec. 2, 2008, Exhibit 286, document titled "quarterly Results from the First Year" [1 pg.].

Deposition of Thomas E. Anderson, in Civil Action No. 2:07cv589 (WDK-FBS), Seattle, WA, Dec. 2, 2008, Exhibit 287, document titled "Technical Status Report for System Support for Active Network Applications (Grant No. F30602-91-1-0205), for Nov. 1998 through Jan. 1999)" [7 pgs.].

Deposition of Thomas E. Anderson, in Civil Action No. 2:07cv589 (WDK-FBS), Seattle, WA, Dec. 2, 2008, Exhibit 288, document titled "The Detour Framework for Packet Rerouting," Andy Collins, Oct. 29, 1998 [20 pgs.].

Deposition of Thomas E. Anderson, in Civil Action No. 2:07cv589 (WDK-FBS), Seattle, WA, Dec. 2, 2008, Exhibit 289, email message of Nov. 9, 1998 [1 pg.].

Deposition of Thomas E. Anderson, in Civil Action No. 2:07cv589 (WDK-FBS), Seattle, WA, Dec. 2, 2008, Exhibit 290, Document titled "Technical Status Report for System Support for Active Network Applications (Grant No. F30602-91-1-0205), for Feb. 1999 through Apr. 1999" [4 pgs.].

Deposition of Thomas E. Anderson, in Civil Action No. 2:07cv589 (WDK-FBS), Seattle, WA, Dec. 2, 2008, Exhibit 291, C.V of Thomas E. Anderson [15 pgs.].

Deposition of Thomas E. Anderson, in Civil Action No. 2:07cv589 (WDK-FBS), Seattle, WA, Dec. 2, 2008, Exhibit 292, document titled "A Simple Approximation to Minimum-Delay Routing," by Vutukury et al., U.S.C, Santa Cruz [12 pgs.].

Deposition of Thomas E. Anderson, in Civil Action No. 2:07cv589 (WDK-FBS), Seattle, WA, Dec. 2, 2008, Exhibit 294, document titled "Akamai preps faster network service as rivals lurk," Jun. 4, 2000, John Borland, CNET News [3 pgs.].

Extended European Search Report dated Aug. 3, 2010 in EP Appln. No. 07024630.1.

JP Appln. No. 2001-504633—Aug. 17, 2010 JPO Decision of Rejection with translation.

Opinion and Order from U.S. District Judge Mark. S. Davis in Civil Action No. 2:07cv589, denying Defendant LimeLight Networks Inc. 's Motion for Summary Judgment, Norfolk, VA, Dec. 29, 2008.

Schemers, R., "Ibnamed—A load balancing name server written in Perl," 1995 Lisa IX—Sep. 17-22, 1995—Monterey, CA.

Transcript of Deposition of Kevin C. Almeroth, Civil Action No. 2:07cv589 (RGD-FBS) (E.D. Va.), Sep. 11, 2008 (redacted) [20 pgs.].

Transcript, Deposition of Thomas E. Anderson, in Civil Action No. 2:07cv589 (WDK-FBS), Seattle, WA, Dec. 2, 2008 [134 pgs.].

First International Workshop on Network and Operating System Support for Digital Audio and Video, Tr-90-062, Nov. 8-9, 1990, International Computer Science Institute (ICSI), Berkeley, California [136 pgs.].

Level 3 Communications, LLC's Supplemental Responses to Limelight Networks, Inc.'s First Set of Interrogatories (No. 4), in civil action No. 2:07-cv-00589-RGD-FBS, in U.S. Dist. Ct. E.D. Va., Sep. 3, 2008, redacted [8 pgs.].

Partridge, C., et al, "An Implementation of the Revised Internet Stream Protocol (ST-2)," Swedish Inst. of Computer Science (SICS), published in Journal of Internetworking: Research and Experience 3(1), Mar. 1992 [36 pgs.].

Transcript of Proceedings (Motion for Summary Judgment), in Civil Action No. 2:07cv589 in U.S. Dist. Ct. E.D. Va., Norfolk, VA., Dec. 18, 2008, [145 pgs.].

European Patent Office, Communication for Application No. EP07024630, dated Aug. 3, 2010, [6 pgs.] including European Search Report [2 pgs.], Annex to European Search Report [1 pg.].

WIPO, International Preliminary Examination Report (IPER) for PCT/US00/16732, Apr. 2001 [4 pgs.].

WIPO, International Search Report (ISR) for PCT/US00/16732, and annex, dated Feb. 6, 2001.

* cited by examiner

N=2

Queries (q=1, TTL=1, g=3)

$C_{AB} < F_0 + L_1 + F_B$

ON-DEMAND OVERLAY ROUTING FOR COMPUTER-BASED COMMUNICATION NETWORKS

CROSS-REFERENCE TO RELATED APPLICATIONS

The present application claims priority from U.S. patent application Ser. No. 09/916,628 for ON-DEMAND OVERLAY ROUTING FOR COMPUTER-BASED COMMUNICATION NETWORKS filed Jul. 27, 2001, now U.S. Pat. No. 6,778,502, issued Aug. 17, 2004; which claims priority from U.S. patent application Ser. No. 09/886,966 for ON-DEMAND OVERLAY ROUTING FOR COMPUTER-BASED COMMUNICATION NETWORKS filed Jun. 25, 2001, now U.S. Pat. No. 6,473,405 issued Oct. 29, 2002 which claims priority from U.S. patent application Ser. No. 09/336,487 for ON-DEMAND OVERLAY ROUTING FOR COMPUTER-BASED COMMUNICATION NETWORKS filed Jun. 18, 1999, now U.S. Pat. No. 6,275,470 issued Aug. 24, 2001, the entirety of each of these applications'is incorporated herein by reference for all purposes.

FIELD OF THE INVENTION

This invention relates to computer networks, and more specifically to a mechanism for finding improved communication paths through a heterogeneous computer network by means of an overlay network.

BACKGROUND AND PRIOR ART

The Internet today consists of a collection of interconnected administrative domains. Each domain is under the control of one or more administrators who decide what hardware equipment to employ and what control software to run. This localized control of the administrative domains requires the coexistence of a number of disparate, heterogeneous systems. The basic communication protocol through which different domains communicate is IP (Internet Protocol). Each Internet data communication is translated into the delivery of a sequence of varying sized IP protocol packets that travel across one or more administrative domains until they reach the final destination.

In IP, the sender of the data only specifies the destination address, whereas the network (the collection of hardware and software systems distributed through several administrative domains) chooses a forwarding path through which to route the IP packets. Routing protocols cooperate across different administrative domains, and through a variety of different software and hardware techniques, to monitor the presence and/or the state of connections in the Internet. Because of the great size and heterogeneous nature of the Internet, and the complexity of the routing task, these routing protocols are typically minimalistic and tend to focus on guarantee of connection and minimizing routing hops rather than optimizing performance. The result, among other problems, is the familiar, frustrating user experience of protracted delay when attempting to access information through the World Wide Web, particularly during periods of heavy usage.

Many proposals to improve the utilization of the Internet exist and feature a wide variety of sophistication and/or response time in changing forwarding paths and thus providing the best routing performance. In practice, these proposals are hardly being used because it is very hard to coordinate their deployment into the Internet. Inter-operation among different administrative domains is crucial and any change to the protocols affecting the forwarding paths may greatly affect the availability of connections. As a result, in practice the forwarding paths between endpoints are determined using very simplistic cost functions and/or heuristics and/or manual intervention. This scheme tends to greatly under-utilize the networks. Depending on local configurations, when faults occur, previously chosen forwarding paths that experience a breakage will be followed for several minutes or hours until the fault is remedied or some manual forwarding path reconfiguration occurs. Several companies, such as Inktomi (Traffic Server product, http://www.inktomi.com) and Akamai (FreeFlow product, http://www.akamai.com) are currently offering and/or developing technology for improving Internet communications speeds by mechanisms which essentially replicate or cache copies of frequently-referenced Internet content, and strategically distribute such copies "closer" to the end-user clients who need the information. Such approaches are valuable, but are often limited or ineffective with respect to dynamically generated content (such as cgi-scripted web pages). Moreover, these approaches generally entail significant costs for using large-capacity computer servers to physically store extra copies of massive volumes of data, and for maintaining synchronization among the various repositories of frequently updated content.

What is needed is a mechanism enabling the selection of optimized network paths for the transmission of data, including dynamically generated data, without requiring any change whatsoever to firmly entrenched communication protocols like IP. Furthermore, preferably the mechanism should be essentially transparent to users of the network.

SUMMARY OF THE INVENTION

The present invention provides an on-demand method and system for discovering optimized paths for the transmission of data between source and destination points on a heterogeneous, computer-based communications network. The invention further provides methods and apparatus for transmitting data along such optimized paths, in a transparent manner that does not require modification of existing communication protocols. The data to be transmitted can (but need not) include pages that are dynamically generated in response to an initial request received by the source from the destination, such as an http request to get a cgi-scripted web page.

Briefly, the present invention discloses steps and means, responsive to requests for transmission of data, for measuring a cost of communicating data from the source point to the destination point along a default path, the default path being derived by means of one or more existing routing mechanisms of the communications network. The invention further provides steps and means for measuring the costs of transmitting the message from the source to the destination along one or more non-default, alternative paths passing through a special group of intermediate nodes. In a preferred embodiment, those intermediate nodes are referred to as an "overlay network". An optimized path for sending the requested transmission is ultimately selected by comparing the default cost against the alternative costs.

Further, the present invention discloses steps and means for transmitting messages along an optimized non-default path passing through overlay nodes, including forwarding of the message from the source to a first one of the intermediate overlay nodes, and from a last one of the intermediate nodes to the destination, in a manner that does not require modification of existing network communication protocols. In a further embodiment, the invention includes steps and means for returning a reply to the transmitted message back along the optimized non-default path from the destination to the source.

Note that whenever referring to "optimized" or "optimal" paths throughout this patent, we simply mean paths that are deemed preferable with respect to selected cost/performance criteria and with respect to a set of identified alternative paths. We are not speaking of global optimality.

DETAILED DESCRIPTION OF THE INVENTION

A. Overview

Figure 1:
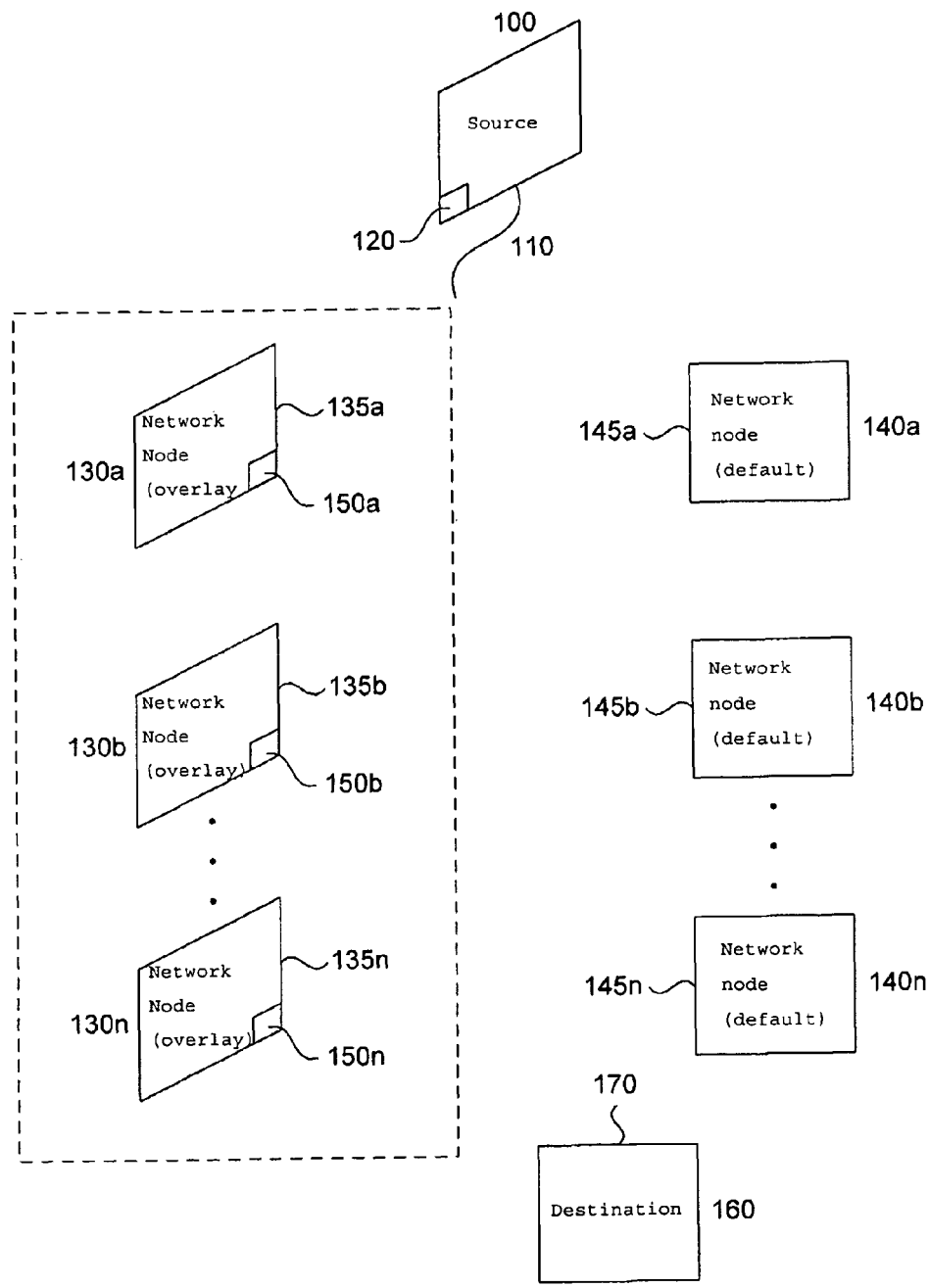
FIG. 1 provides an architectural overview of an overlay network, in a preferred embodiment of the present invention, integrated with a heterogeneous client-server network such as the Internet.

A preferred embodiment of the present invention provides a mechanism for finding and using optimized paths for the transmission of data between source and destination points on a computer network such as the Internet, for example, without requiring any modifications to existing communication protocols. The mechanism preferably combines an overlay routing mechanism with an on-demand routing mechanism, which may be very briefly summarized as follows:

1) An overlay network of alternate routing mechanisms is constructed on top of the existing Internet routing mechanisms to find and exploit available resources. The overlay routing mechanism is completely transparent and separate from the Internet routing protocols and is preferably deployed throughout some small, but widely distributed, portion of the Internet as a distributed user application. FIG. 1 exemplifies the concept. Nodes 100 and 160 are, respectively, source and destination nodes for an intended communication on a network such as the Internet. These nodes are connected to the underlying network via transmission links 110 and 160, respectively. Nodes 140a-n (connected to the underlying network via links 145a-n) represent other network nodes, and might potentially be nodes that are utilized in a default communication path between node 100 and node 170, depending on the routing mechanisms of the network. Overlay network nodes 130a-n utilize existing network transmission lines and infrastructure, via network links 135a-n, to create a virtual topology. The overlay network preferably includes a number of computing devices such as nodes 130a-n that cooperate to provide forwarding paths overlaid over an underlying network. Overlay network nodes preferably communicate using existing, established Internet protocols and thus do not require any modifications to current standards. Each overlay node 130 preferably includes overlay path module 150, and either the source or destination node similarly includes overlay path module 120; these components are programmed and operable to combine available IP protocols in order to provide additional functionality for exploiting overlay routing when it is advantageous to do so, as described below in detail. In our preferred embodiment, the overlay network includes a set of ordinary computer systems (e.g., Pentium-based PC's) co-located at Internet sites such as major ISP locations. These PC's each include overlay path modules 150 in the form of additional custom software modules, for purposes of the present invention, operable to measure and record connection cost information and optimal forwarding path information, as described in greater detail herein. The overlay network is a virtual network; in other words, although it uses new additional hardware (co-located boxes), it preferably uses the existing network and cabling infrastructure for all communications. Effectively, this overlay network provides a large set of alternate paths with measurable communication costs around the Internet. Clients can use these alternate paths if they are found to provide better service to their desired destinations than would a default path.

2) Alternate, improved forwarding paths through the overlay network nodes are discovered on demand. The process is outlined in the flow diagram of FIG. 2. In step 200, the pertinent process is initiated when a user who is connected to source "A" (i.e., node 100 of FIG. 1) (either directly or indirectly as by way of a network gateway) requests communication of a message to destination B. In response, at step 210, if the threshold cost is exceeded by the default path for the requested communication, then at steps 220-225 (as described in more detail below) overlay path module 120 broadcasts queries which are received and processed by one or more of overlay nodes 130a-n; overlay path modules 150 cooperate to discover alternative paths through overlay nodes 130 and to measure the costs of such alternate paths. Measuring the cost of data transmission along a given path (per steps 210, 220) is generally performed using conventional techniques, depending on the cost metric to be measured. For example, connection delay time can easily be measured by "pinging" the destination of interest from the source node of interest. At steps 230-235 these alternative paths are compared to the existing Internet route or previously chosen overlay routes.

3) If a new path is found through the overlay network nodes that has better performance than the default path, at steps 230 and 235, then at step 240 information describing this improved path is preferably sent to each of the overlay network nodes 130 that will be involved in the new path. At step 250, a preferred embodiment of our invention employs a mechanism to route packets through the new path in a transparent manner and without modification of any of the default Internet communication mechanisms. Preferably, a form of IP encapsulation is used, as described below in more detail. The default path is preferably used in step 260, in those cases where no new path is found through the overlay network nodes that has better performance than the default path.

The various processes and structures in a preferred embodiment of the present invention will now be discussed individually in greater detail.

B. On-Demand Discovery of Improved Overlay Forwarding Paths

1. Monitoring

Our invention preferably provides on-demand routing, discovering and adding useful forwarding paths through the overlay network only when needed. This avoids having to pre-compute and record all possible forwarding paths in advance, and advantageously uses the default Internet routing mechanism for bootstrapping and default operations. More particularly, the preferred embodiment of our invention creates a new forwarding path from endpoint A to endpoint B only when: (1) an end-to-end communication is requested between A and B (per step 200 of FIG. 2), and (2) a path is discovered through the overlay routing network that provides better performance than the default Internet route (per steps 210-215 of FIG. 2).

Therefore, the discovery of an overlay forwarding path preferably starts with monitoring one or more cost/performance metrics of interest for the data communications that are carried out on the default Internet routing path. Such monitoring would most typically be performed at a gateway router or the source endpoint, node 100. Module 120 employs a predetermined cost function that combines the monitored metrics and detects end-to-end communications that do not meet specific predetermined requirements. For such communications, the detection process would extract from the monitoring operations (1) the source address A, (2) the destination address B and (3) the cost of the data communication from A to B. Computation of cost information is discussed further below. This information is then used in the process of on-demand forwarding path discovery, as discussed below.

2. Finding an Improved Path

Source node 100 (as well as any of the routers on the default Internet forwarding path) can potentially discover end-to-end communications that do not meet specific requirements. In that event, in order to initiate steps 220-225, module 120 sends a query to the overlay network nodes 130 to determine if the overlay network is capable of offering a better forwarding path. The query is preferably sent to a specified number ("q") of the overlay network routers 130, depending on the configuration. In a relatively simple embodiment, each of the q forwarding path query messages preferably includes: (1) a destination address B, (2) a source address A, and (3) an identifier for a predefined cost function F. In the example illustrated in FIG. 1, source A is node 100, and destination B is node 160. Cost function F is preferably drawn from a set of network communication performance metrics such as delay, throughput, jitter or loss, in accordance with the practitioner's priorities and needs.

When each of the q overlay network nodes 130 receives a forwarding path query, it performs step 220 and measures the assigned cost function F with respect to communications transmitted to destination address B from overlay node, yielding the value F(B,i). F(B,i) is measured for a default network path from the ith overlay node to destination B. In this simple embodiment, the querying node's module 120 receives a single reply from each of the q overlay network routers queried. The querying node at any time during the reception of the replies may decide to pick a particular forwarding path and ignore any additional query replies. In order to pick an optimized forwarding path, the querying node's module 120 preferably combines the F(B) value in each reply with the cost function F(i,A) which measures the cost of communication to overlay node 130$i$ from the querying node, once again along a default network path. As those of skill in the art will appreciate, the combining of cost functions may entail adding values (as where the cost metric is delay) or calculating the minimum value (as for bandwidth), or in general may involve a complex parameterized combination of the cost functions. In any case, at steps 230-235 module 120 preferably uses the computed total costs for the alternative overlay paths and for the default path to select an optimized path for communication between source node 100 (A) and destination node 160 (B).

3. Finding Improved Paths Through Multiple Overlay Nodes

In general, for an overlay network with multiple overlay nodes 130*a-n*, it may be useful to consider alternative overlay paths that pass through more than one overlay node ("multi-hop paths"). This section describes an alternative, preferred embodiment that includes discovery of multi-hop paths.

Figure 3A:
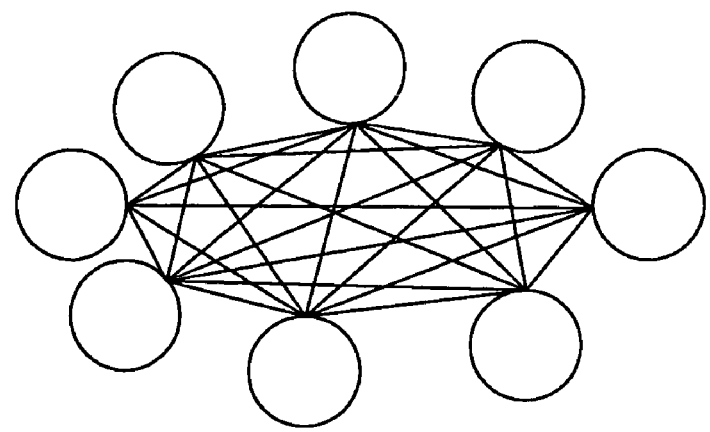
FIG. 3a graphically represents an example of overlay network topology, with full mesh connectivity.
Figure 3B:
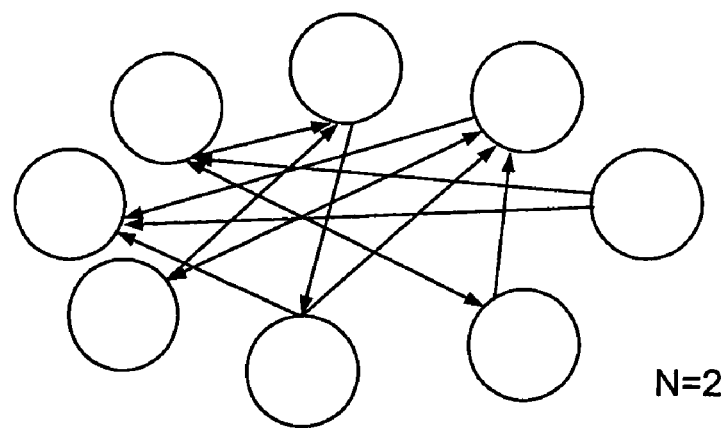
FIG. 3b graphical represents an example of overlay network topology, after pruning in accordance with a preferred embodiment of the present invention.

In principle, an overlay network is capable of logical complete connectivity (in other words, any overlay node can communicate with any other node) through the underlying default Internet routing mechanisms. However, for purposes of multi-hop path discovery, it is generally not computationally worthwhile attempting to exhaustively evaluate the set of all possible multi-hop paths. Therefore, in our preferred embodiment, a topological representation of overlay network connectivity is pruned so as to reduce the number of possible forwarding paths to other overlay nodes from any given overlay node to a fixed, relatively small number ("N"). For example, FIG. 3*a* illustrates the initial topological representation for an overlay network consisting of 8 nodes with complete connectivity, while FIG. 3*b* illustrates a pruned topology for the same overlay network, but this time with N=2.

In this alternative preferred embodiment, each overlay node module 150 measures the cost of communication (via the underlying network's default communication paths) to all other overlay router nodes. For each of a given node 130*i*'s neighbors, the cost functions L(j,i) measuring the cost of default communication from overlay node 130*i* to neighbor overlay node 130*j* are used for pruning and subsequently for route discovery. In the pruning process, each overlay network node 130*i* starts with the full connectivity mesh to all other overlay network nodes, and a set of costs L(j,i) associated with the links to each other overlay node 130*j*. The pruning operation preferably consists of two phases. In the first phase, direct links that are more expensive than indirect links are deleted. In the second phase, if there are still more than N direct links from any given overlay node, additional direct links with worst cost functions are pruned. At the end of these two phases each overlay network router has <=N direct link connections, thus satisfying the preferred constraint, and the resulting overall topology of the overlay network may or may not be fully connected. The resulting topology is then used in the subsequent process of alternate path discovery.

The forming of the initial topology and the determination of the final logical topology and associate link costs are preferably performed using the default Internet communication mechanisms. If the overlay nodes are connected to each other by means of specialized or enhanced communication mechanisms—which is by no means required—overlay link costs L(j,i) would be computed on that basis.

Figure 2:
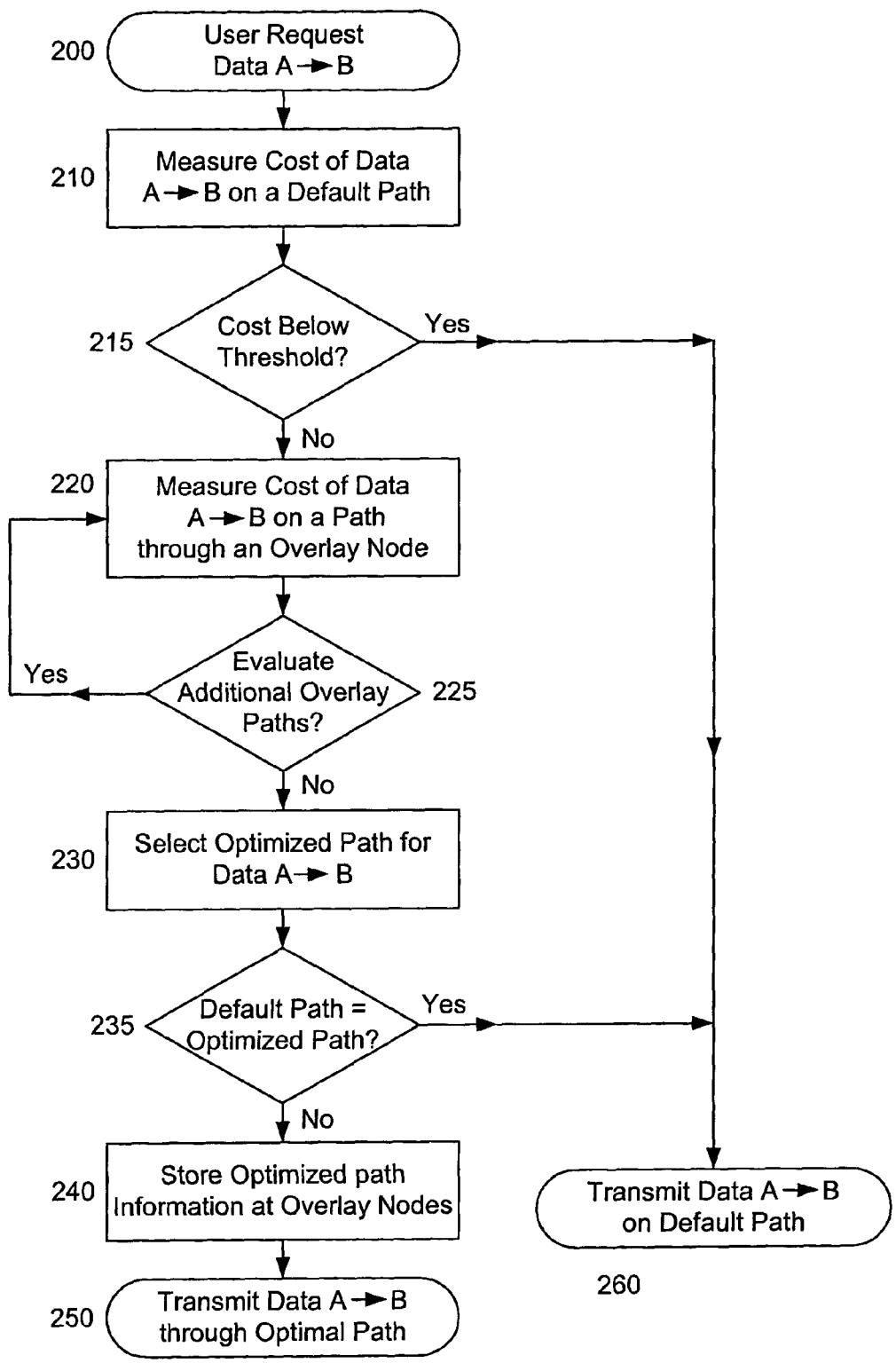
FIG. 2 diagrams the basic series of steps performed in a preferred embodiment of the present invention in order to discover an improved forwarding path for data transmission through one or more overlay nodes, and to transmit the data to its intended destination through the improved path.

Step 225 in conjunction with step 220 of FIG. 2 correspond to the path discovery process in the multi-hop embodiment. In this embodiment, path queries are sent to the overlay network as previously described in the simplified embodiment, but such queries preferably further include a "time-to-live" field ("TTL') that is decremented each time a forwarding path query is received by a node. Just as in the simplified embodiment, at step 220 each overlay node receiving a path query computes a value F(B,i). In addition, however, if the TTL field is non-zero, each overlay node receiving such a query decrements the TTL field and forwards the query to all of its neighbors in the pruned representation of the overlay network logical topology (preferably at most N neighbors, as discussed above). Each such overlay node then replies to the querying node with its own measured F(B,i), and the set of costs L(i,j) for links to each of its topological neighbors.

Figure 4A:
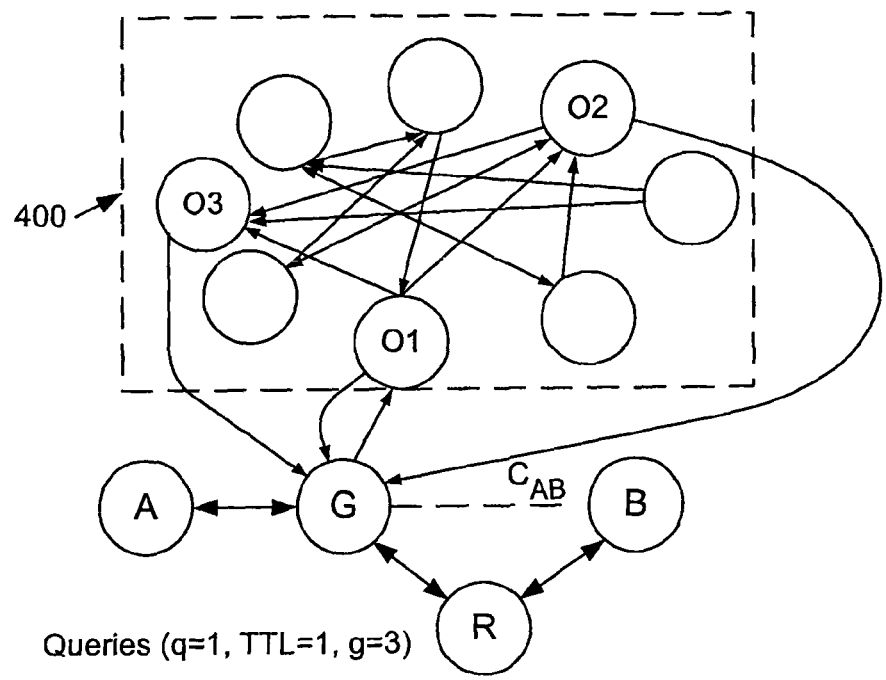
FIG. 4a graphically represents the discovery of an optimized path through overlay nodes for transmitting network data from a source to a destination.
Figure 4B:
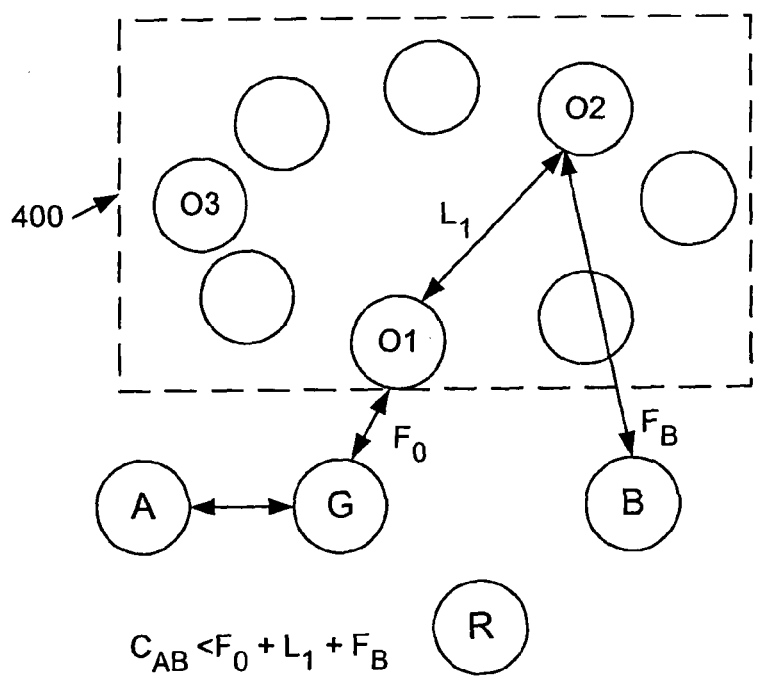
FIG. 4b graphically represents the association of a cost with an optimized path through overlay nodes for transmitting network data from a source to a destination.

In this multi-hop preferred embodiment, in order to compute and compare the relevant total costs for each of the possible overlay forwarding paths at steps 230-235, module 110 of the querying node combines all of the appropriate cost functions. Thus, in the example of FIG. 4a, the ultimate communication path of interest is between gateway node G (through which source node A accesses the network) and destination node B. The cost of the default network path from G to B is represented abstractly by node R, and shown to have total cost C(A,B). FIG. 4a also depicts a pruned topology representation for overlay network 400, as in FIG. 3b, with eight overlay nodes and a connectivity of N=2. As indicated in FIG. 4a, in this example gateway node G sends a single path-discovery query to overlay node O1, and receives a total of three alternate overlay path replies. In FIG. 4b, one such alternate overlay path is the multi-hop forwarding path shown passing from gateway G to overlay node O1 to overlay node O2 and finally to destination B. In that example, the relevant total cost for the alternate overlay path is derived by combining F(O1, G), L(O2, O1), and F(B, O2).

C. Construction and Use of Overlay Forwarding Paths

In the event that an overlay forwarding path is selected at steps 230-235 as the optimized path for sending the user's requested communication, a preferred embodiment of our invention combines existing Internet protocols in an manner that dynamically constructs forwarding paths through the overlay network.

Referring again to FIG. 2, following the detection of an improved overlay forwarding path at steps 230 and 235, information describing the improved forwarding path is stored at step 240 by the originator of the path query (e.g., typically module 110 of source node 100) and by each of the overlay nodes involved in the improved path. The path information is preferably stored at each overlay node 130 in a table or the like, so that when given a specified destination endpoint, an overlay node on the forwarding path can retrieve the address of the next node on the non-default path to whom the message should be forwarded. In a preferred embodiment of our invention, this information may be deleted by the overlay nodes if no end-to-end communication happens between A and B for more than a predefined amount of time, or if the overlay forwarding path's performance is believed to become worse that the default Internet path—or simply after some specified amount of time passes, so that subsequent communication requests will result in discovery and measurement of overlay paths based on the new, current state of the network.

Figure 5:
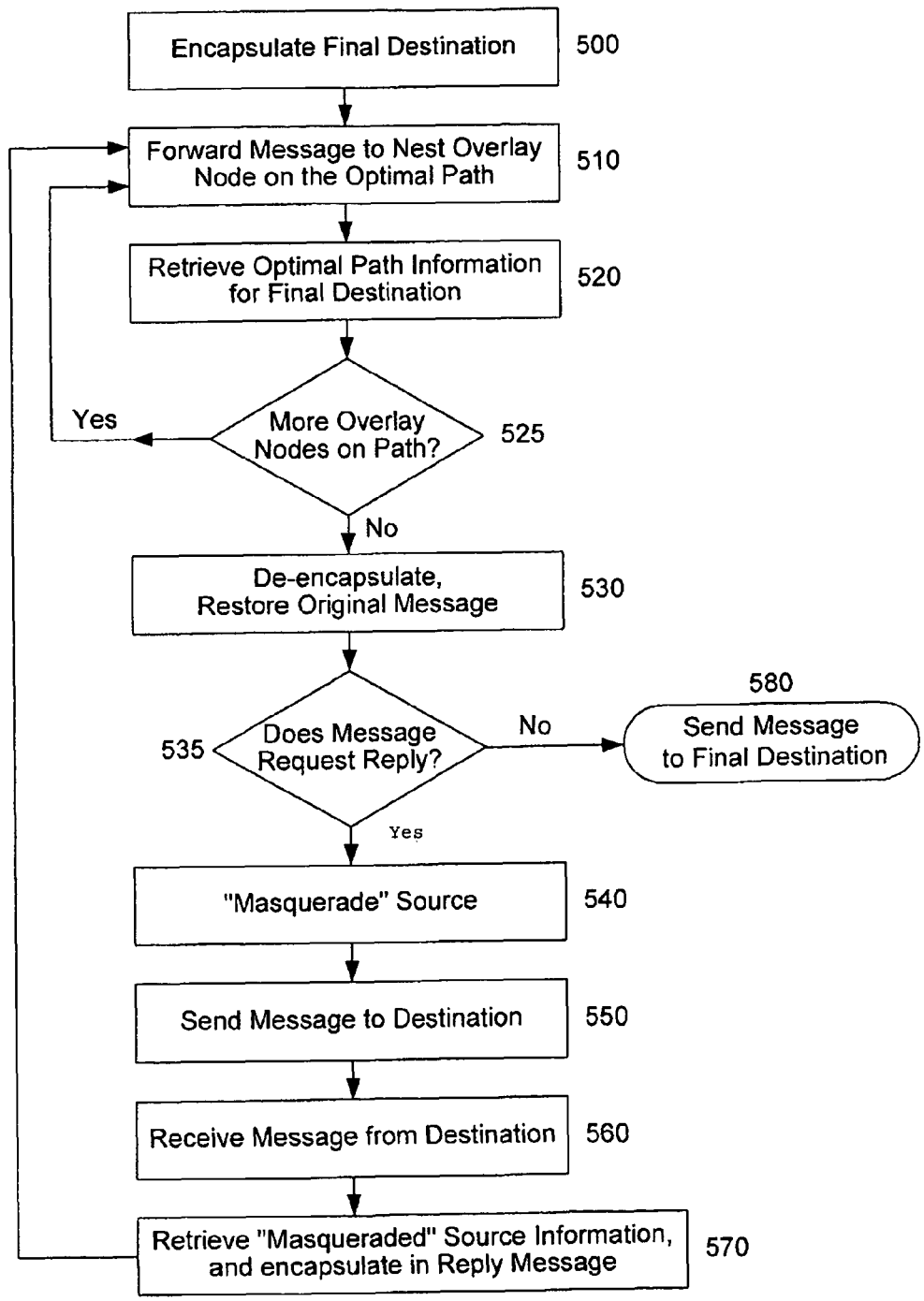
FIG. 5 diagrams the steps performed in a preferred embodiment of the invention in order to transmit data along an optimized forwarding path through one or more overlay network nodes, without modification of existing network routing protocols.

FIG. 5 provides a more detailed view of the method performed to transmit message data through a non-default overlay path (step 250 of FIG. 2), in a preferred embodiment of the present invention. By way of background, message packets in accordance with protocols like the IP protocol generally include "source" and "destination" fields. The "destination" field is used by routing mechanisms in the nodes of the underlying communications network (e.g., the Internet) to forward packets toward their intended destination. In a preferred embodiment of the present invention, a technique called "encapsulation" is a primary mechanism by which our system effectively bypasses default Internet routing paths and utilizes optimized, alternative forwarding paths through overlay nodes. Encapsulation substitutes an original destination IP address with a different destination IP address, and records the original destination address in an encoded capsule.

For illustration, we will begin with a simple example, in which the message is one-way (no reply), and the alternative overlay path is a one-hop path (i.e., it goes through a single overlay node). In this example, the client at node 100 (or a client connected through gateway node 100 to the network) wishes to send a message on a network such as the Internet to destination node 160. In accordance with a preferred embodiment of the present invention, steps 210-240 are first performed, to discover an optimized overlay path for communicating with 160. Suppose this process determines that, at the present moment, an optimized path for sending a message to 160 (better than the default network path, at any rate) is to send packets from 100 to overlay node 130a, and then to forward them from 130a to 160. In other words, the desired path strategy is to send packets from 100 to 130a using the default network path for 100→130a, and then forward those packets from 130a to 160 using the default network path for 130a→160. At step 250, this transmission is actually carried out, as detailed in FIG. 5. At step 500, overlay software 120 at node 100 addresses the packets to 130a, instead of 160, but also "encapsulates" or encodes the address of 160 in a predetermined format incorporated in the message. The message is then sent to overlay node 130a, at step 510, preferably by means of default network routing mechanisms. When 130a receives the packets, overlay software 150a decodes or de-encapsulates the encapsulated data, and finds the encoded "160" address. At step 520, module 150a of node 130a checks the overlay path information stored earlier at step 240 to identify the next node on the overlay forwarding path. Because, in this example, there are no more overlay nodes on the forwarding path, software 150a proceeds to step 530, and restores the original message with its destination address reset to node 160. Again, because this example involves no reply message, software 150a proceeds to step 580 and simply forwards the packets on to their final destination at node 160. In this way, the original message gets from client (or gateway) 100 to destination node 160, along an optimized non-default path passing through overlay node 130a. This is accomplished without any need to modify the established communications protocols of the underlying network (e.g., IP), and without any modification (or even awareness) of destination node 160.

We next present a further example, involving a multi-hop overlay path; once again, the example treats a one-way communication. In this example, we assume that the process of steps 210-240 discovers an optimized path for transmitting messages from 100 to 160, passing through overlay nodes 130a and 130b. In other words, this time the desired path strategy is to send packets from 100 to 130a using the default network path for 100→130a, then forward those packets from 130a to 130b using the default network path for 130a→130b, and finally to forward those packets from 130b to 160 using the default network path for 130b 160. Once again, at step 500, overlay software 120 at node 100 addresses the packets to 130a, and encapsulates the address of 160. The message is then sent to overlay node 130a, at step 510. When 130a receives the packets, overlay software 150a finds the encoded "160" address, and at step 520, software 150a of node 130a checks the overlay path information stored earlier at step 240 and identifies overlay node 130b as the next node on the overlay forwarding path. Following the flow of FIG. 5, module 150a loops back to step 510 and forwards the message to overlay node 130b, where module 150b performs similar functionality. This time, at step 520, module 150*b* determines that there are no more overlay nodes on the forwarding path, and thereupon (at step 530) restores the original message with its destination address reset to node 160. Because this example again involves no reply message, software 150*b* proceeds to step 580 and forwards the packets on to their final destination at node 160. In this way, the original message gets from client (or gateway) 100 to destination node 160, along an optimized non-default path passing through overlay nodes 130*a* and 130*b*; and once again, this is accomplished without any need to modify the established communications protocols of the underlying network.

As a third example, we will now consider the case of a message that requests a return reply (such as an http request to get a file), once again in the context of the multi-hop forwarding path through overlay nodes 130*a* and 130*b* as in the previous example. In this scenario, our preferred embodiment operates in the same manner as in the previous example, until module 150*b* reaches step 535 and determines that the message does indeed request a return reply from the destination node 160. Following the flow in FIG. 5, at step 540 module 150*b* "masquerades" source information for the packets. In our preferred embodiment, the last overlay node on a forwarding path performs the task of masquerading, in order to allow bi-directional use of the overlay forwarding path. In the absence of masquerading, the reply sent by node 160 to node 100 would normally follow a return path using default network routing. In general, masquerading replaces the source address of IP packets with the address of the node executing the masquerade, and records enough information locally so as to be able restore the original source address if and when a replay IP packet is returned. In a preferred embodiment and in the context of a network like the Internet, module 150 of a masquerading node locally stores the original source address and the port from which it sent the packet (a port uniquely identifies which connections a node has with any other network node). At step 550, overlay node 130*b* sends the masqueraded message to destination node 160. If and when reply packets are sent from node 160, they will be addressed to overlay node 130*b*, because of the masqueraded source information. When the reply comes back on the appropriate port of node 130*b*, at step 570 module 150*b* retrieves the original source address for node 100 that was previously stored at step 540—which is the true intended destination of the reply message being handled—and constructs a reply message encapsulating the intended destination address of node 100. Returning to step 510, module 150*b* forwards the encapsulated message to the next overlay node on an optimized path to node 100, by accessing path information previously stored at step 240 (in this case, the path information is of course just the inverse of the optimized overlay path for communications being sent from source 100 to destination 160).

In this manner, control and data packets exchanged between source and destination endpoints on a network are advantageously re-routed through an overlay network without any modification of the source or destination nodes (except for the addition of module 110 at the source), and without any modification of the established communication protocols for the underlying network. This transparency is a valuable benefit created by preferred embodiments of the present invention, because it increases the applicability of this approach as a practical solution for legacy network-based applications.

D. Cost Metrics, Applications

There are many potential applications of this invention to practical problems of interest to companies, individuals, and other entities. Cost/performance metrics may be freely chosen as beneficial for desired applications. For example, preferable metrics include delay, throughput, jitter, and loss. Some sample applications will now be discussed.

1. Reliability

Online trading is an Internet application that is assuming a very important role in today's global economy. Real-time trading requires uninterrupted access to the points of sale. A delay of a few minutes in carrying out an order can cost an online trader large amounts of money. In fact it can be argued that the trader with the best and most reliable Internet service will have a definite advantage over others. In this application of our invention we illustrate how dynamic on-demand overlay routing can allow routing around a failure that would otherwise cause the inability to sell or buy shares.

At present, all Internet routing protocols have a built-in mechanism to rebuild routing paths, and therefore ultimately allow detection and reaction to a network fault in appropriate ways. In the default case, a stock trader's ability to carry out orders in the presence of a link failure is dependent on the rerouting capability of its ISP and may greatly vary. Current routing practices typically require anywhere from a minimum of 45 seconds for a localized ad-hoc solution, to a maximum of several hours depending on the particular ISP. The fast, light-weight, on-demand routing capability made possible in accordance with the present invention can potentially reduce the time required for suitable re-routing to less than a few seconds. In a preferred embodiment, when a stock trader pushes a button to enter a trade, the TCP connection delay is passively measured by a rerouting daemon running on the trader's internal network. This measurement is performed with a timeout of 1 second. In case of a link failure the TCP connection measurement would timeout. Immediately after this measurement, our rerouting daemon sends a query to the overlay network specifying its measured connection time (1 second in case of a link failure). If the overlay network is able to find an alternate route to the destination it will return the new route to the rerouting daemon within a few milliseconds. The new route is immediately installed on the stock trader's local network and any subsequent TCP connection requests are forwarded through the newly discovered route rather than the faulty route. This rerouting mechanism has two major advantages for the stock trader: (1) The reaction to finding a new route is reduced from minutes to less than two seconds and (2) the rerouting mechanism is entirely decoupled from his/her ISP configuration and can be independently managed.

2. Bandwidth

The diffusion of multimedia data through the Internet is likely to become much more prominent with the increase of bandwidth to the home. Current bandwidth availability is enough for audio transmission and some low quality video but in the near future, the increase in bandwidth will allow the transmission of full motion video. In addition to the increase of raw bandwidth Quality of Service Routing and other resource allocation protocols (such as RSVP) will allow user applications to acquire a predictable amount of bandwidth in order to guarantee an adequate level of service. The transition of the Internet to using these new protocols is likely to be problematic and diffused over several years.

In this domain, the present invention enables the addition of an additional layer of control on top of the QOS service provided by Internet standards. In this application the overlay network's function is to oversee the resulting performance of the system and its protocols. In this case one can think of an overlay system in accordance with the present invention as a fall-back when the default Internet mechanism does not deliver the necessary quality of service. An overlay routing system in accordance with the present invention can be used to find paths that offer better bandwidth than those provided by the default Internet protocols (either current or future). In this application the end system which is receiving the video can passively monitor the quality of the video being received. A rerouting daemon running on the local network of the user detects that the video quality is poor by measuring the average bit rate consumed by the reception of the video. When the bit rate falls below a certain threshold the routing daemon can query the overlay network for a better path. The overlay network measures the available bit rates that are available through alternate paths and returns the appropriate overlay-forwarding path to the user (if any). The overlay nodes measure the available bit rate of the alternate paths by requesting a video from the video source and measuring the quality of the link. Such requests will be performed using the default Internet protocols and thus do not need to be described here. The overlay nodes requesting the video should be configured to possess the same credentials of the user on whose behalf the rerouting is attempted. In addition to measuring the effective throughput from the video source, the overlay nodes also measure, through the transmission of test packets, the quality of the overlay links to the user. If an overlay forwarding path with better total bandwidth is found, the routing daemon is notified and the video reception is rerouted through the overlay network. In this transition loss of synchronization may occur and the user may experience discontinuity in the viewing; this drawback needs to be considered in allowing the rerouting only when the discomfort of the signal degradation due to loss of bandwidth can be considered greater than the resynchronization discontinuity.

3. Delay

Hyperspace is bringing people together in ways that were unimaginable a few years ago. The many-to-many communication paradigm made possible by the Internet is creating a revolution in how people communicate, do business and spend their leisure time. In many of these revolutionary applications one gets the illusion of interacting with a community of other users in near real-time. As an example of how our system can be used in this context, we describe a video game application in which a user participates in a video game over the Internet. In this application lowering the transmission delay can enhance the quality of the game. In addition, if the game is played by several individuals located at different locations on the Internet, lower delay may also provide an advantage in playing the game because of a faster response time.

A preferred embodiment of the present invention can find overlay forwarding paths that reduce the total transmission delay. In this type of application the measurement of the quality of the end-to-end default-forwarding path is actively carried out. This type of application would most likely run over UDP, which lacks control-signaling messages that can be used to passively measure round trip delays. Furthermore, unlike the video streaming application, no predefined quality of service can be used in assessing the quality of the link.

In this application the routing daemon (located on the user private network) sends test packets to the destination which provoke a reply (for example an ICMP echo packet). The round-trip delay is therefore iteratively measured by the routing daemon in order to assess the delay to the destination. If the delay is measured to be too high (above a predefined threshold) the routing daemon queries the overlay network to see if a lower delay route can be found. If a lower delay route is found the routing daemon seamlessly switches the route to the overlay thus improving the quality of the transmission. In this case the user may or may not experience any discontinuity in the game depending on how the game is implemented.

E. Conclusion, Scope of the Invention

Thus the reader will see that preferred embodiments of on-demand overlay routing in accordance with the present invention can provide a practical, lightweight, economical mechanism for improving network performance. The mechanism is highly transparent, as well, and does not necessitate changes in underlying network protocols such as IP, or in client application programs that rely upon network communications.

While the above description includes many specifics and examples, these should not be construed as limitations on the scope of the invention, but rather as exemplification of a preferred embodiment thereof. Many other variations are possible. For example, while the previous examples were presented in terms of an IP network like the Internet, the present invention is applicable to networking protocols other than IP, and to other network layers and communication protocols including but by no means limited to http, ftp, TCP, and SSL. The invention is applicable as well to packet-switched networks other than the Internet, and to other static-topology networks (whether packet switched or connection-oriented). Also, the same mechanisms can be used where other network properties are optimized (e.g., security), and can be realized with software-only implementations such as by using active networks infrastructure, or other available computational resources).

Accordingly, the scope of the invention should be determined not by the embodiment illustrated, but by the appended claims and their legal equivalents.

I claim:

1. A method for transmitting content in a communications network, the method comprising:
   (A) configuring a table to cause content to be routed over a first path in said communications network;
   (B) comparing an elapsed time relative to the transmission of content via the first path against a threshold amount of time;
   (C) based at least in part on the comparing step (B), when said elapsed time relative to the transmission of content via the first path exceeds the threshold amount of time, querying at least one overlay software module for one or more costs associated with one or more alternate paths;
   (D) comparing the one or more costs associated with the one or more alternate paths and a cost associated with the first path;
   (E) based at least in part on the comparing step (D), selecting the first path or an alternate path as an optimal path based at least in part on which path is associated with a lower cost; and
   (F) modifying the table to cause content to be routed over the optimal path in said communications network; and
   wherein the communications network comprises the Internet and wherein communication among nodes of the first path uses at least an Internet protocol, and communication among nodes of the one or more alternate paths uses at least the Internet protocol.

2. A method as recited in claim 1, wherein the first path is an overlay forwarding path.

3. A method as recited in claim 1, wherein the modifying step (F) comprises: designating a neighboring node in the optimal path as a next hop.

4. A method as recited in claim 1, wherein a first network comprises the first path and a second network comprises the one or more alternate paths.

5. A node in a communications network, the node comprising:

a first port operable to receive content destined for a destination node in the communications network;

one or more output ports operable to transmit content to at least a first path in said communications network and a second path in said communications network;

an overlay software module operable to determine a first cost associated with the first path and a second cost associated with the second path; and a table configurable to cause content received at the first port to be selectively transmitted from the one or more output ports to either the first path or the second path in response to instructions derived from: (A) an analysis of an amount of elapsed time during which the table has been configured such that content has been transmitted from the one or more output ports to a current path and (B) a comparison of the first cost and the second cost; and wherein the current path comprises the first path and, wherein the table is modifiable to cause content to be routed from the one or more output ports to the second path if the amount of elapsed time exceeds the threshold amount of time and the first cost is greater than the second cost; and wherein the communications network comprises the Internet and wherein communication among nodes of the first path uses at least an Internet protocol, and communication among nodes of the second path uses at least the Internet protocol.

6. A node as recited in claim 5, wherein the first path is an overlay forwarding path.

7. A node as recited in claim 5, wherein the current path comprises the first path and, wherein the table is operable to be modified to designate a neighboring node in the second path as a next hop.

8. A node as recited in claim 5, wherein a first network comprises the first path and a second network comprises the second path.

9. A method for transmitting content in a communications network, wherein a table entry is configured to cause content to be transmitted via a first path in said communications network, the method comprising:
   (A) comparing an elapsed time associated with transmitting content via the first path with a threshold amount of time;
   (B) modifying the table to cause content to be transmitted via a second path in said communications network as a result of the comparing step when: (i) the elapsed time associated with transmitting content via the first path exceeds the threshold amount of time; and (ii) a first cost associated with the first path is greater than a second cost associated with the second path, wherein at least the second cost is determined by querying an overlay software module; and wherein the communications network comprises the Internet and wherein communication among nodes of the first path uses at least an Internet protocol, and communication among nodes of the second path uses at least the Internet protocol.

10. A method as recited in claim 9, wherein a first network comprises the first path and a second network comprises the second path.

11. A method for transmitting content in a communications network, the method comprising:
   (A) configuring a table to cause content be routed to a first path in said communications network;
   (B) comparing an elapsed time associated with transmitting content via the first path against a threshold amount of time;
   (C) modifying the table to cause content to be routed to a second path in said communications network when the elapsed time exceeds the threshold amount of time;
   (D) subsequent to the modifying step (C), comparing a first cost associated with transmitting content via the second path against a threshold cost;
   (E) if the first cost exceeds the threshold cost, querying at least one overlay software module for one or more costs associated with one or more alternate paths;
   (F) comparing the first cost and the one or more costs associated with one or more alternate paths;
   (G) based at least in part on the comparing step (F), selecting the second path or an alternate path as an optimal path based at least in part on which path is associated with a lower cost, and
   (H) modifying the table to cause content to be routed to the optimal path; and
   wherein the communications network comprises the Internet and wherein communication among nodes of the second path uses at least an Internet protocol, and communication among nodes of the one or more alternate paths uses at least the Internet protocol.

12. A method as recited in claim 11, wherein the threshold cost is based at least in part on a maximum elapsed time.

13. A method as recited in claim 11, wherein the threshold cost is based at least in part on a delay metric.

14. A method as recited in claim 11, wherein the threshold cost is based at least in part on a performance metric.

15. A method as recited in claim 11, wherein a first network comprises the first path and a second network comprises the second path.

16. A method for transmitting content in a communications network, the method comprising:
   (A) configuring a table to cause content to be routed via a first path in said communications network, said first path having been determined based at least in part on a first cost associated with transmitting content via the first path; and
   (B) in response to an elapsed time relative to said configuring in step (A) exceeding a threshold time, querying at least one overlay software module for one or more costs associated with one or more alternate paths;
   (C) comparing the one or more costs associated with the one or more alternate paths and a second cost associated with the first path;
   (D) based at least in part on the comparing step (C), selecting the first path or an alternate path as an optimal path based at least in part on which path is associated with a lower cost; and
   (E) modifying the table to cause content to be routed via the optimal path in said communications network; and
   wherein the communications network comprises the Internet and wherein communication among nodes of the first path uses at least an Internet protocol, and communication among nodes of the one or more alternate paths uses at least the Internet protocol.

17. A method as recited in claim 16, wherein the second cost and the one or more costs associated with the one or more alternate paths are based at least in part on the then-current state of the network.

18. A method as recited in claim 16, wherein the first path comprises at least one overlay node.

19. A method as recited in claim 16, wherein the one or more alternate paths comprises at least one overlay node.

20. A method for transmitting content in a communications network, the method comprising:

(A) configuring a table to cause content to be routed to a first node, a first network comprising said first node; and then, in response to an elapsed amount of time relative to the configuring step (A) exceeding a threshold time,
(B) querying at least one overlay software module for one or more costs associated with one or more alternate nodes;
(C) comparing the one or more costs associated with the one or more alternate nodes and a cost associated with the first node;
(D) based at least in part on the comparing step (C), selecting the first node or an alternate node as a next hop based at least in part on which node is associated with a lower cost; and
(E) modifying the table to cause content to be routed to the next hop,
wherein the communications network comprises the Internet and wherein communication among nodes on the first network uses at least an Internet protocol, and communication among the one or more alternate nodes uses at least the Internet protocol; and
wherein a first overlay path comprises the first node and wherein a second overlay path comprises the one or more alternate nodes.

* * * * *